United States Patent
Goswami et al.

(10) Patent No.: US 11,881,143 B2
(45) Date of Patent: Jan. 23, 2024

(54) DISPLAY PEAK POWER MANAGEMENT FOR ARTIFICIAL REALITY SYSTEMS

(71) Applicant: META PLATFORMS TECHNOLOGIES, LLC, Menlo Park, CA (US)

(72) Inventors: Nilanjan Goswami, Livermore, CA (US); Eugene Gorbatov, Sammamish, WA (US); Steve John Clohset, San Francisco, CA (US); Michael Yee, Woodinville, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/499,633

(22) Filed: Oct. 12, 2021

(65) Prior Publication Data
US 2023/0113746 A1    Apr. 13, 2023

(51) Int. Cl.
*G09G 3/20* (2006.01)
*G06F 3/01* (2006.01)

(52) U.S. Cl.
CPC ........... *G09G 3/2007* (2013.01); *G06F 3/012* (2013.01); *G06F 3/013* (2013.01); *G09G 2320/0686* (2013.01); *G09G 2330/023* (2013.01); *G09G 2354/00* (2013.01)

(58) Field of Classification Search
None
See application file for complete search history.

(56) References Cited

U.S. PATENT DOCUMENTS

| 7,379,560 | B2 * | 5/2008 | Bradski | G06F 1/3231 |
| | | | | 382/103 |
| 2007/0092006 | A1 * | 4/2007 | Malayath | H04N 19/156 |
| | | | | 375/240.24 |
| 2008/0111833 | A1 * | 5/2008 | Thorn | G06F 1/3231 |
| | | | | 345/690 |

(Continued)

FOREIGN PATENT DOCUMENTS

CN    104133548 A    * 11/2014

OTHER PUBLICATIONS

Tan et al., 'FocusVR: Effective and usable VR display power management', Proc. of ACM on Interactive, Mobile, Wearable and Ubiquitous Technologies, vol. 2(3), 142:1-25. (Year: 2018).*

*Primary Examiner* — Patrick F Valdez
(74) *Attorney, Agent, or Firm* — Greenberg Traurig, LLP

(57) ABSTRACT

In particular embodiments, a computing system of a device may determine a display peak power budget allocated for a display component of the device. The system may determine display information including display workload and display telemetry associated with the display component. The system may determine, in accordance with a display peak power management policy applied to the display peak power budget and the display information, one or more display-controlling parameters for maintaining the display component to operate within the display peak power budget. The system may determine, based on the one or more display-controlling parameters, a plurality of grayscales for a plurality of regions on a display screen of the device. The system may adjust a rendered frame based on the plurality of grayscales and output the adjusted rendered frame on the display screen of the device.

20 Claims, 14 Drawing Sheets

(56) References Cited

U.S. PATENT DOCUMENTS

| | | | |
|---|---|---|---|
| 2015/0002554 A1* | 1/2015 | Kupershmidt | G09G 3/3208 345/77 |
| 2016/0274659 A1* | 9/2016 | Caraffi | H04N 5/232411 |
| 2017/0193965 A1* | 7/2017 | Karsten | G09G 5/003 |
| 2018/0137602 A1* | 5/2018 | Spitzer | G06T 1/20 |
| 2018/0329465 A1* | 11/2018 | Tavakoli | G06F 1/3215 |
| 2019/0295503 A1* | 9/2019 | Ouderkirk | G09G 5/04 |
| 2020/0064631 A1* | 2/2020 | Robbins | G06F 3/013 |
| 2020/0174080 A1* | 6/2020 | Feldman | H02J 7/0029 |
| 2020/0265797 A1* | 8/2020 | Croxford | G09G 3/2092 |
| 2021/0174768 A1* | 6/2021 | Jarvenpaa | G09G 5/37 |
| 2022/0005259 A1* | 1/2022 | Surti | G06T 15/005 |
| 2022/0146832 A1* | 5/2022 | Choi | G06F 3/011 |

\* cited by examiner

DISPLAY PEAK POWER MANAGEMENT FOR ARTIFICIAL REALITY SYSTEMS

TECHNICAL FIELD

This disclosure generally relates to system peak power management. In particular, the disclosure relates to display peak power management for artificial reality systems, such as virtual reality or augmented reality systems.

BACKGROUND

One of the key challenges for implementing peak power management in artificial reality systems (e.g., virtual reality systems or augmented reality systems) is availability of fast control knobs for managing system load. A display component may often be one of the biggest consumers of peak power budget in an artificial reality system, such as in augmented reality glasses, and therefore any peak power budgeting and throttling mechanism needs to deal with display peak power. As such, there is a need to ensure that the display peak power consumed by the display component of the artificial reality system does not exceed an allocated display peak power budget while providing best image quality and user experience. Also, managing system peak power including display peak power is important for ensuring that an overall system peak power is not exceeded to prevent battery burnout and abrupt system shutdown. Such unexpected shutdowns may result in poor user experience and, if it is reproducible, may create an appearance that the artificial reality system has fundamental design flaws.

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. Artificial reality systems that provide artificial reality content may be implemented on various platforms, including a head-mounted device (HMD) connected to a host computer system, a standalone HMD, a mobile device or computing system, or any other hardware platform capable of providing artificial reality content to one or more viewers.

SUMMARY OF PARTICULAR EMBODIMENTS

In particular embodiments, a fuel gauge component of a system (e.g., artificial reality system) may determine a system peak power based on one or more of battery state of charge, battery wear out, or system temperature. The system peak power may indicate a total amount of power (e.g., current) that can be drawn by the system to perform its functionalities by one or more system components. The fuel gauge may send the system peak power and other battery-related information (e.g., battery voltage, resistance) to a system peak power manager. The system peak power manager may be responsible for ensuring that the system peak power is not exceeded to prevent battery burnout and abrupt system shutdown. The system peak power manager may allocate peak power budgets to one or more system components based on the system peak power and other system information, such as system state, system workload, and system telemetry.

In particular embodiments, the system peak power manager may separately provide a display peak power budget to a display peak power manager. Given that a display component is often one of the biggest consumers of peak power budget in the system (e.g., AR glasses), it is particularly important to manage display peak power and ensure that the display component operates within the allotted display peak power budget. The display peak power manager may be configured to ensure that the display component of the system operates within the given display peak power budget. For example, given the display peak power budget of 4 watts, the display peak power manager is responsible to make sure that the display component of the system when rendering a display does not go beyond 4 watts. The display peak power manager may include a display peak power management policy to ensure this. For instance, the display peak power management policy may define or outline power requirements and display properties for displaying different types of content at different situations and for satisfying the display peak power budget.

In particular embodiments, the display peak power management policy may configure one or more display control knobs or display-controlling parameters to meet the display peak power budget. In particular embodiments, the display peak power management policy uses current graphics or display workload and display telemetry to determine a combination of display-controlling parameters. The display-controlling parameters are parameters for maintaining the display component to operate within the display peak power budget. In particular embodiments, these display-controlling parameters may define how the display component should render a display at run time in order to meet the peak power requirements without substantially degrading user viewing experience or display quality.

In particular embodiments, the display-controlling parameters may be used to implement a gaze-based grayscale control to meet the display peak power budget. For instance, gaze-based grayscale control approach may be used to meet the peak power allocation (e.g., display peak power budget) by adjusting one or more of grayscale pixel values in periphery regions or by adjusting a size of a fovea region. The gaze-based grayscale control approach may set an upper limit or clip grayscale pixel values that are outside of the fovea region to meet peak power allocation. The number of periphery regions may be tuned to gradually dim the periphery to minimize impact on image quality. In addition, the size of the fovea region may be controlled or adjusted as well based on current display power budget. In particular embodiments, to implement the gaze-based grayscale control or gaze-based display, the display-controlling parameters may define, for example and without limitation, 1) the size of the fovea region specified as a bounding box and aligned on tile boundary, 2) number of peripheral regions (up to a max value) and their bounding boxes, and 3) grayscale for each of the peripheral regions. Other display-controlling parameters may also be used to meet the display peak power budget. These additional parameters may define adjustments with respect to a display fill rate (e.g., horizontal fill rate), pulse-width modulation (PWM) values for adjusting display brightness, grayscale, rolling start window (RSW), and stop display roll.

Gaze-based grayscale control approach has several advantages for display peak power management. Some of the advantages may include, for example and without limitation, (1) fovea region provides an upper bound on the number of white/100% intensity pixels in the display, (2) the periphery region's maximum grayscale may be adjusted to meet peak power requirements with minimum image quality degradation, (3) most augmented reality (AR) content fits into the fovea region and therefore may not see any image quality degradation.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system, and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

One of the key challenges for implementing peak power management in systems (e.g., artificial reality system 100 or near-eye display system 200) is availability of fast control knobs for managing system load. A display component may often be one of the biggest consumers of peak power budget in these systems, therefore any peak power budgeting and throttling mechanism needs to deal with display peak power. As such, there is a need to ensure that the display peak power consumed by a display component of the system does not exceed an allocated display peak power budget while providing best image quality and user experience. Also, managing system peak power including display peak power is important for ensuring that an overall system peak power is not exceeded to prevent battery burnout and abrupt system shutdown. Such unexpected shutdowns may result in poor user experience and, if it is reproducible, may create an appearance that the artificial reality system has fundamental design flaws.

Figure 8:
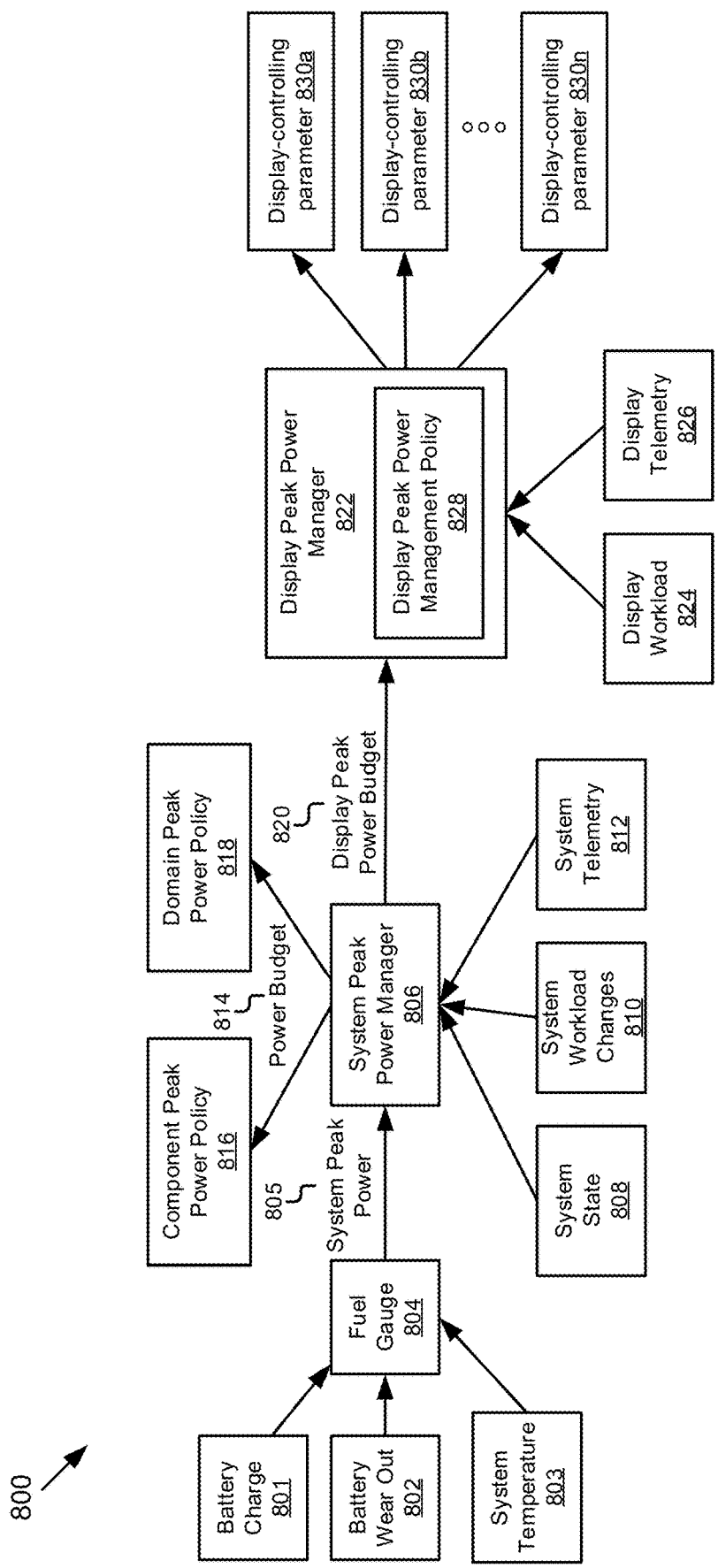
FIG. 8 illustrates an example flow diagram for overall system peak power management including display peak power management, in accordance with particular embodiments.

In particular embodiments, a fuel gauge component (e.g., fuel gauge 804 as shown in FIG. 8) of the system (e.g., artificial reality system 100 or near-eye display system 200) may determine a system peak power based on one or more of battery state of charge, battery wear out, or temperature. The system peak power may indicate a total amount of power (e.g., current) that can be drawn by the system to perform its functionalities by one or more system components. The fuel gauge may send the system peak power and other battery-related information (e.g., battery voltage, resistance) to a system peak power manager (e.g., system peak power manager 806 as shown in FIG. 8). The system peak power manager may be responsible for ensuring that the system peak power is not exceeded to prevent battery burnout and abrupt system shutdown. The system peak power manager may allocate peak power budgets to one or more system components based on the system peak power and other system information, such as system state, system workload changes, and system telemetry.

In particular embodiments, the system peak power manager may separately provide a display peak power budget to a display peak power manager (e.g., display peak power manager 822 as shown in FIG. 8). The display peak power manager may be configured to ensure that the display component of the system operates within the given display peak power budget. For example, given the display peak power budget of 4 watts, the display peak power manager is responsible to make sure that the display component of the system when rendering a display does not go beyond 4 watts. The display peak power manager may include a display peak power management policy to ensure this. For instance, the display peak power management policy may define or outline power requirements and display properties for displaying different types of content at different situations and for satisfying the display peak power budget.

Figure 9:
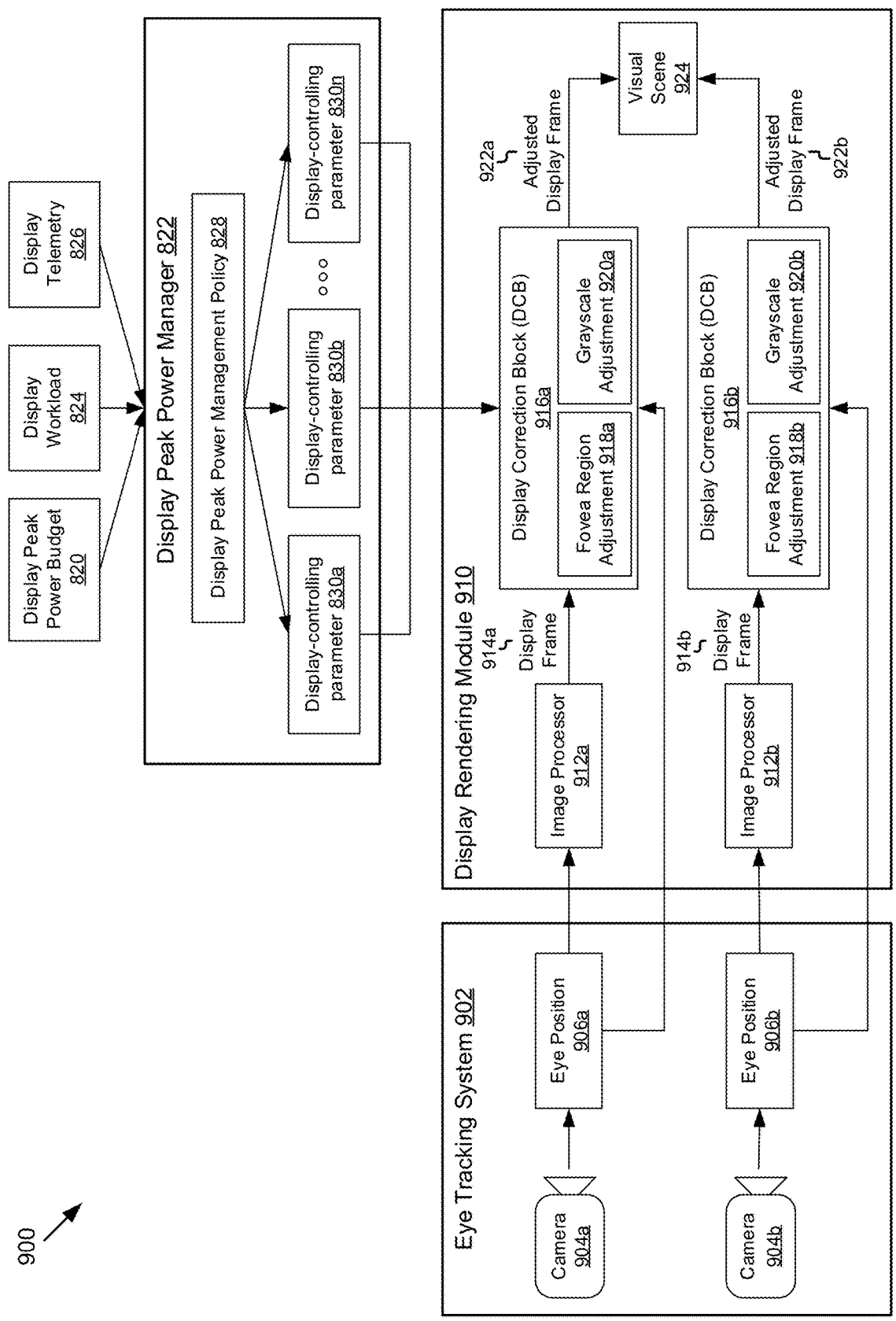
FIG. 9 illustrates an example flow diagram for gaze-based grayscale control for display peak power management, in accordance with particular embodiments.

In particular embodiments, the display peak power management policy may configure one or more display control knobs or display-controlling parameters (e.g., display-controlling parameters 830a, 830b, . . . 830n as shown in FIG. 8 or FIG. 9) to meet display peak power allocation or the display peak power budget. In particular embodiments, the display peak power management policy uses current graphics or display workload and display telemetry to determine a combination of display-controlling parameters. The display-controlling parameters are parameters for maintaining the display component to operate within the display peak power budget. In particular embodiments, these display-controlling parameters may define how the display component should render a display at run time in order to meet the peak power requirements without substantially degrading user viewing experience or display quality.

In particular embodiments, the display-controlling parameters may be used to implement a gaze-based grayscale control to meet the display peak power budget, as shown and discussed below in reference to FIG. 9. For instance, gaze-based grayscale control approach may be used to meet the peak power allocation (e.g., display peak power budget) by adjusting one or more of grayscale pixel values in periphery regions or by adjusting a size of a fovea region. The gaze-based grayscale control approach may set an upper limit or clip grayscale pixel values that are outside of the fovea region to meet peak power allocation. The number of periphery regions may be tuned to gradually dim the periphery to minimize impact on image quality. In addition, the size of the fovea region may be controlled or adjusted as well based on current display power budget. In particular embodiments, to implement the gaze-based grayscale control or gaze-based display, the display-controlling parameters may define, for example and without limitation, 1) the size of the fovea region specified as a bounding box and aligned on tile boundary, 2) number of peripheral regions (up to a max value) and their bounding boxes, and 3) grayscale for each of the peripheral regions. Other display-controlling parameters may also be used to meet the display peak power budget. These additional parameters may define adjustments with respect to a display fill rate (e.g., horizontal fill rate), pulse-width modulation (PWM) values for adjusting display brightness, grayscale, rolling start window (RSW), stop display roll, etc.

System peak power management including display peak power management and gaze-based grayscale control for display peak power management are discussed in detail below with respect to at least FIGS. 8-12.

Example Systems

Figure 1:
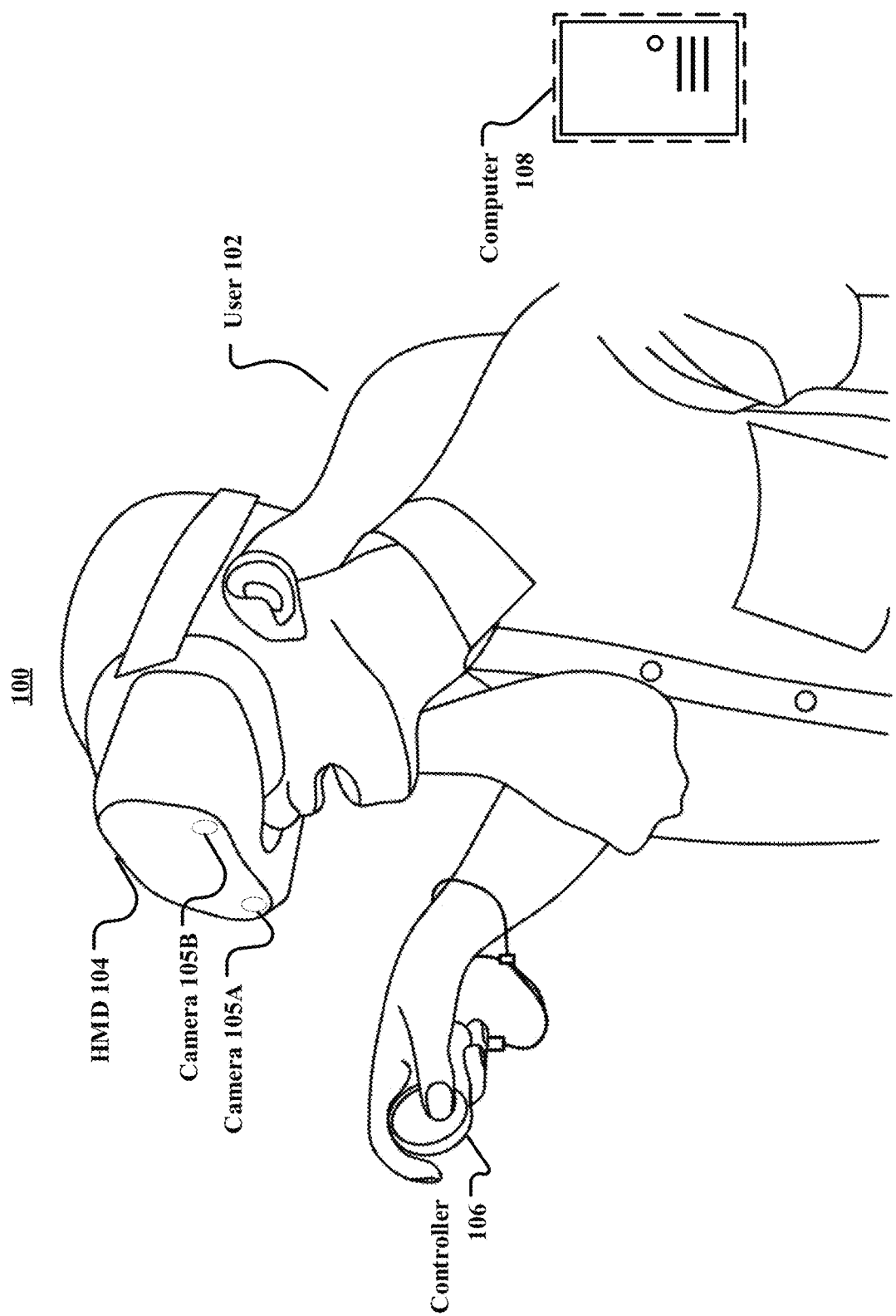
FIG. 1 illustrates an example system, in accordance with particular embodiments.

FIG. 1 illustrates an example of an artificial reality system 100 worn by a user 102. In particular embodiments, the artificial reality system 100 may comprise a head-mounted device ("HMD") 104, a controller 106, and a computing system 108. The HMD 104 may be worn over the user's eyes and provide visual content to the user 102 through internal displays (not shown). The HMD 104 may have two separate internal displays, one for each eye of the user 102. As illustrated in FIG. 1, the HMD 104 may completely cover the user's field of view. By being the exclusive provider of visual information to the user 102, the HMD 104 achieves the goal of providing an immersive artificial-reality experience.

The HMD 104 may have external-facing cameras, such as the two forward-facing cameras 105A and 105B shown in FIG. 1. While only two forward-facing cameras 105A-B are shown, the HMD 104 may have any number of cameras facing any direction (e.g., an upward-facing camera to capture the ceiling or room lighting, a downward-facing camera to capture a portion of the user's face and/or body, a backward-facing camera to capture a portion of what's behind the user, and/or an internal camera for capturing the user's eye gaze for eye-tracking purposes). The external-facing cameras are configured to capture the physical environment around the user and may do so continuously to generate a sequence of frames (e.g., as a video).

The 3D representation may be generated based on depth measurements of physical objects observed by the cameras 105A-B. Depth may be measured in a variety of ways. In particular embodiments, depth may be computed based on stereo images. For example, the two forward-facing cameras 105A-B may share an overlapping field of view and be configured to capture images simultaneously. As a result, the same physical object may be captured by both cameras 105A-B at the same time. For example, a particular feature of an object may appear at one pixel $p_A$ in the image captured by camera 105A, and the same feature may appear at another pixel $p_B$ in the image captured by camera 105B. As long as the depth measurement system knows that the two pixels correspond to the same feature, it could use triangulation techniques to compute the depth of the observed feature. For example, based on the camera 105A's position within a 3D space and the pixel location of $p_A$ relative to the camera 105A's field of view, a line could be projected from the camera 105A and through the pixel $p_A$. A similar line could be projected from the other camera 105B and through the pixel $p_B$. Since both pixels are supposed to correspond to the same physical feature, the two lines should intersect. The two intersecting lines and an imaginary line drawn between the two cameras 105A and 105B form a triangle, which could be used to compute the distance of the observed feature from either camera 105A or 105B or a point in space where the observed feature is located.

In particular embodiments, the pose (e.g., position and orientation) of the HMD 104 within the environment may be needed. For example, in order to render the appropriate display for the user 102 while he is moving about in a virtual environment, the system 100 would need to determine his position and orientation at any moment. Based on the pose of the HMD, the system 100 may further determine the viewpoint of either of the cameras 105A and 105B or either of the user's eyes. In particular embodiments, the HMD 104 may be equipped with inertial-measurement units ("IMU"). The data generated by the IMU, along with the stereo imagery captured by the external-facing cameras 105A-B, allow the system 100 to compute the pose of the HMD 104 using, for example, SLAM (simultaneous localization and mapping) or other suitable techniques.

In particular embodiments, the artificial reality system 100 may further have one or more controllers 106 that enable the user 102 to provide inputs. The controller 106 may communicate with the HMD 104 or a separate computing unit 108 via a wireless or wired connection. The controller 106 may have any number of buttons or other mechanical input mechanisms. In addition, the controller 106 may have an IMU so that the position of the controller 106 may be tracked. The controller 106 may further be tracked based on predetermined patterns on the controller. For example, the controller 106 may have several infrared LEDs or other known observable features that collectively form a predetermined pattern. Using a sensor or camera, the system 100 may be able to capture an image of the predetermined pattern on the controller. Based on the observed orientation of those patterns, the system may compute the controller's position and orientation relative to the sensor or camera.

The artificial reality system 100 may further include a computer unit 108. The computer unit may be a stand-alone unit that is physically separate from the HMD 104 or it may be integrated with the HMD 104. In embodiments where the computer 108 is a separate unit, it may be communicatively coupled to the HMD 104 via a wireless or wired link. The computer 108 may be a high-performance device, such as a desktop or laptop, or a resource-limited device, such as a mobile phone. A high-performance device may have a dedicated GPU and a high-capacity or constant power source. A resource-limited device, on the other hand, may not have a GPU and may have limited battery capacity. As such, the algorithms that could be practically used by an artificial reality system 100 depends on the capabilities of its computer unit 108.

Figure 2:
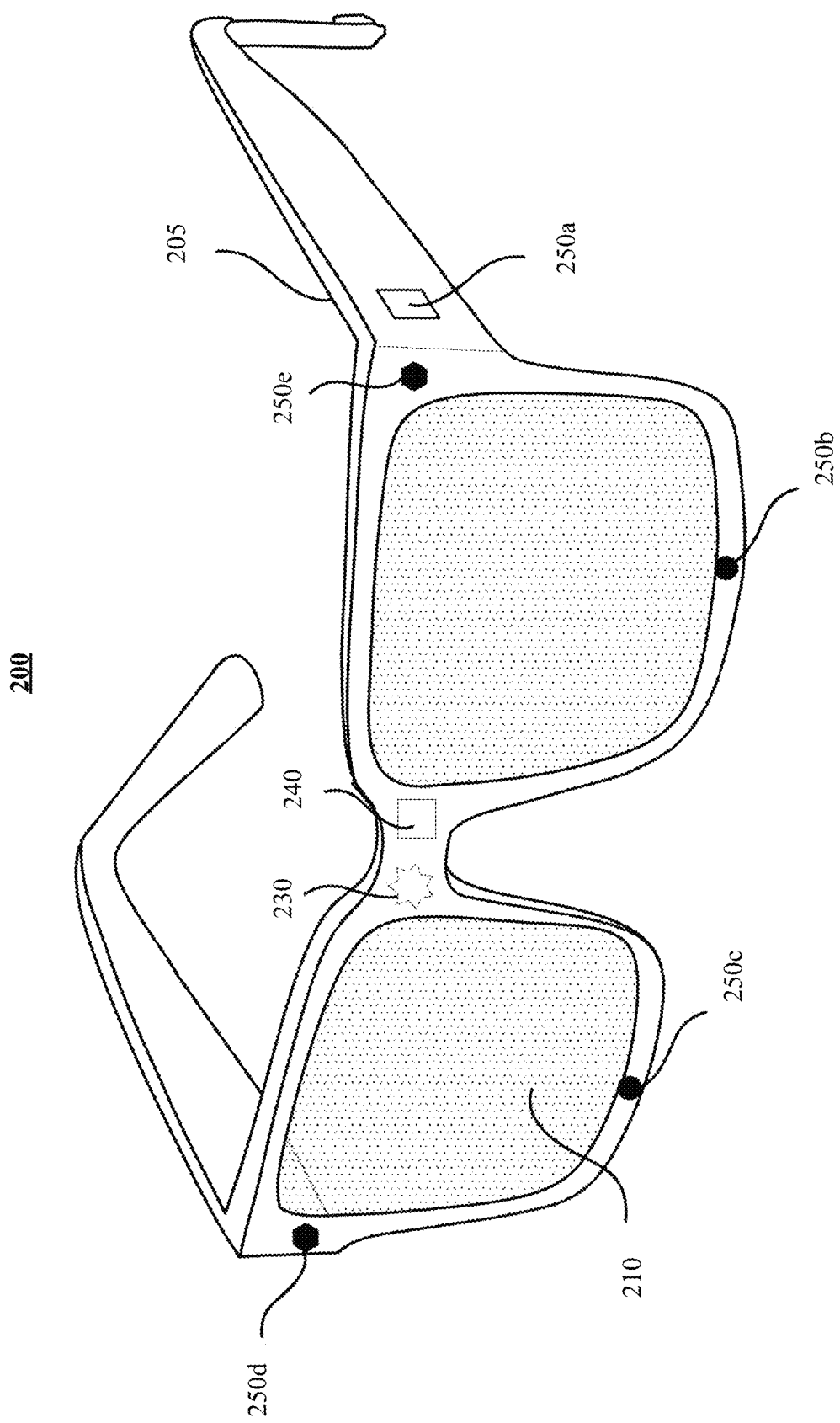
FIG. 2 illustrates an example of another system, in accordance with particular embodiments.

FIG. 2 is a perspective view of an example of a near-eye display system 200 in the form of a pair of glasses for implementing some of the examples disclosed herein. Near-eye display system 200 may be a specific implementation of the artificial reality system 100 of FIG. 1, and may be configured to operate as a virtual reality display, an augmented reality display, and/or a mixed reality display. Near-eye display system 200 may include a frame 205 and a display 210. Display 210 may be configured to present content to a user. In some embodiments, display 210 may include display electronics and/or display optics. For example, display 210 may include an LCD display panel, an LED display panel, or an optical display panel (e.g., a waveguide display assembly).

Near-eye display system 200 may further include various sensors 250a, 250b, 250c, 250d, and 250e on or within frame 205. In some embodiments, sensors 250a-250e may include one or more depth sensors, motion sensors, position sensors, inertial sensors, or ambient light sensors. In some embodiments, sensors 250a-250e may include one or more image sensors configured to generate image data representing different fields of views in different directions. In some embodiments, sensors 250a-250e may be used as input devices to control or influence the displayed content of near-eye display 200, and/or to provide an interactive VR/AR/MR experience to a user of near-eye display 200. In some embodiments, sensors 250a-250e may also be used for stereoscopic imaging.

In some embodiments, near-eye display system 200 may further include one or more illuminators 230 to project light into the physical environment. The projected light may be associated with different frequency bands (e.g., visible light, infra-red light, ultra-violet light, etc.), and may serve various purposes. For example, illuminator(s) 230 may project light in a dark environment (or in an environment with low intensity of infra-red light, ultra-violet light, etc.) to assist sensors 250a-250e in capturing images of different objects within the dark environment. In some embodiments, illuminator(s) 230 may be used to project certain light patterns onto the objects within the environment.

In some embodiments, near-eye display system 200 may also include a high-resolution camera 240. Camera 240 may capture images of the physical environment in the field of view. The captured images may be processed, for example, by a virtual reality engine to add virtual objects to the captured images or modify physical objects in the captured images, and the processed images may be displayed to the user by display 210 for AR or MR applications.

Image Rendering

Figure 3:
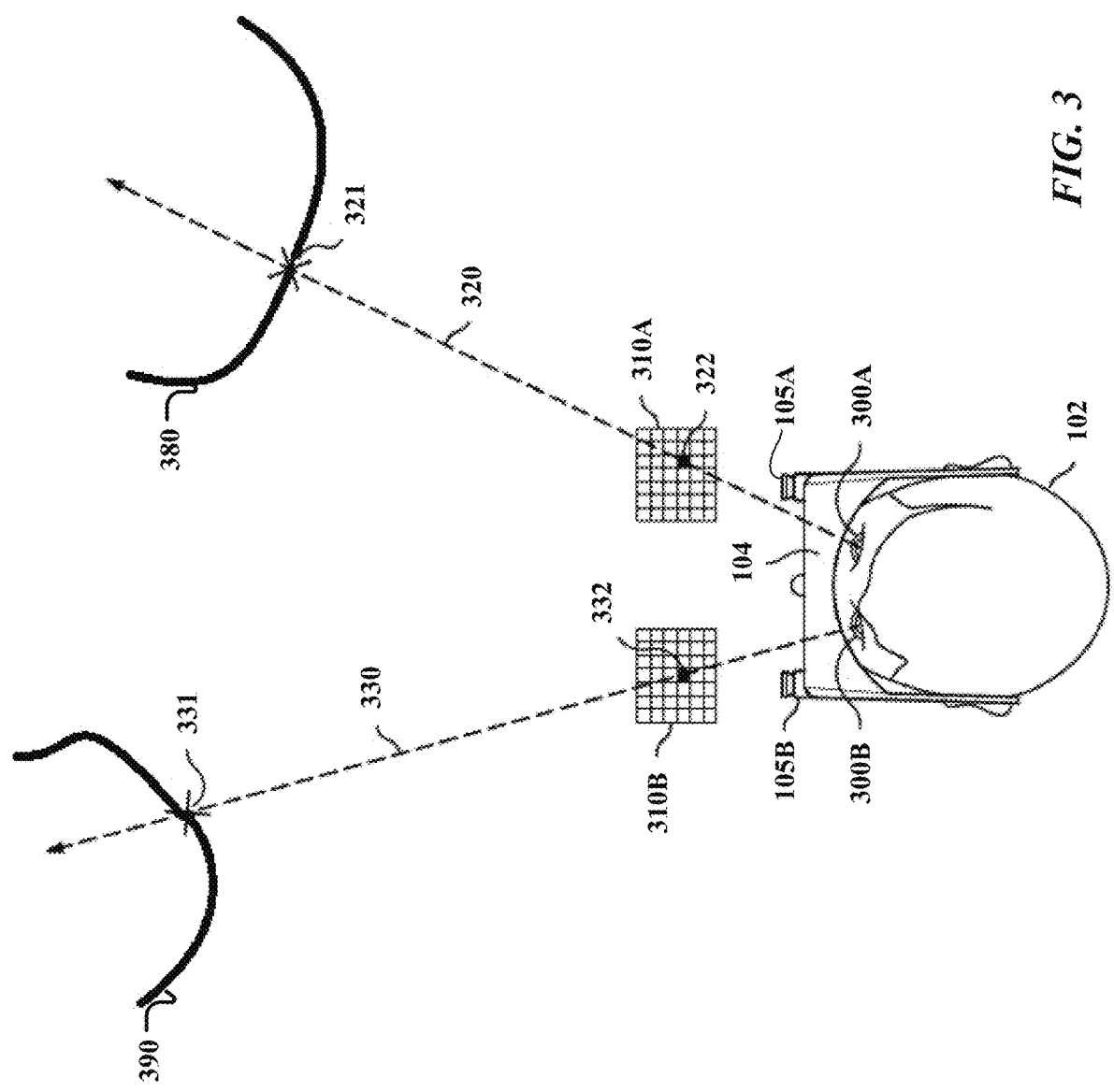
FIG. 3 provides an illustration of an example image rendering process for rendering a display on a system, in accordance with particular embodiments.

FIG. 3 provides an illustration of an example image rendering process for rendering a display on a system, such as the artificial reality system 100 or the near-eye display system 200. In particular embodiments, a rendering system may determine the user's 102 current viewing position relative to their environment. In particular embodiments, the system may compute the pose of the HMD 104 using SLAM or other suitable techniques. Based on the known mechanical structure of the HMD 104, the system could then estimate the viewpoints of the user's eyes 300A and 300B using offsets from the pose of the HMD 104. The system may then render an image for each of the user's eyes 300A-B. For example, to render an image for the user's right eye 300A, the system may cast a ray 320 from the estimated viewpoint of the right eye 300A through each pixel of a virtual screen space 310A to see which portion of a 3D model would be intersected by the ray 320. This ray casting process may be referred to as a visibility test, as the objective is to determine what is visible from the selected viewpoint 300A. In the particular example shown, the ray 320 projected through a particular pixel 322 intersects with a particular point 321 on the 3D model 380. This indicates that the point of intersection 321 is to be displayed by the pixel 322. Once the point of intersection 321 is found, the rendering system may sample a corresponding point in a texture image that is mapped to the point of intersection 321. In particular embodiments, the image captured by the cameras 105A-B of the HMD 104 may be used to generate a texture for the 3D model 380. Doing so allows the rendered image to appear more like the actual physical object. In a similar manner, the rendering system may render a passthrough image for the user's left eye 300B. In the example shown, a ray 330 may be cast from the left-eye viewpoint 300B through pixel 332 of the left screen space 310B. The ray 330 intersects the 3D model 390 at location 331. The rendering system may then sample a texture image at a texture location corresponding to the location 331 on the model 390 and compute the appropriate color to be displayed by pixel 332. Since the images are re-rendered from the user's viewpoints 300A-B, the images would appear natural and provide proper parallax effect.

Eye Tracking

Figure 4:
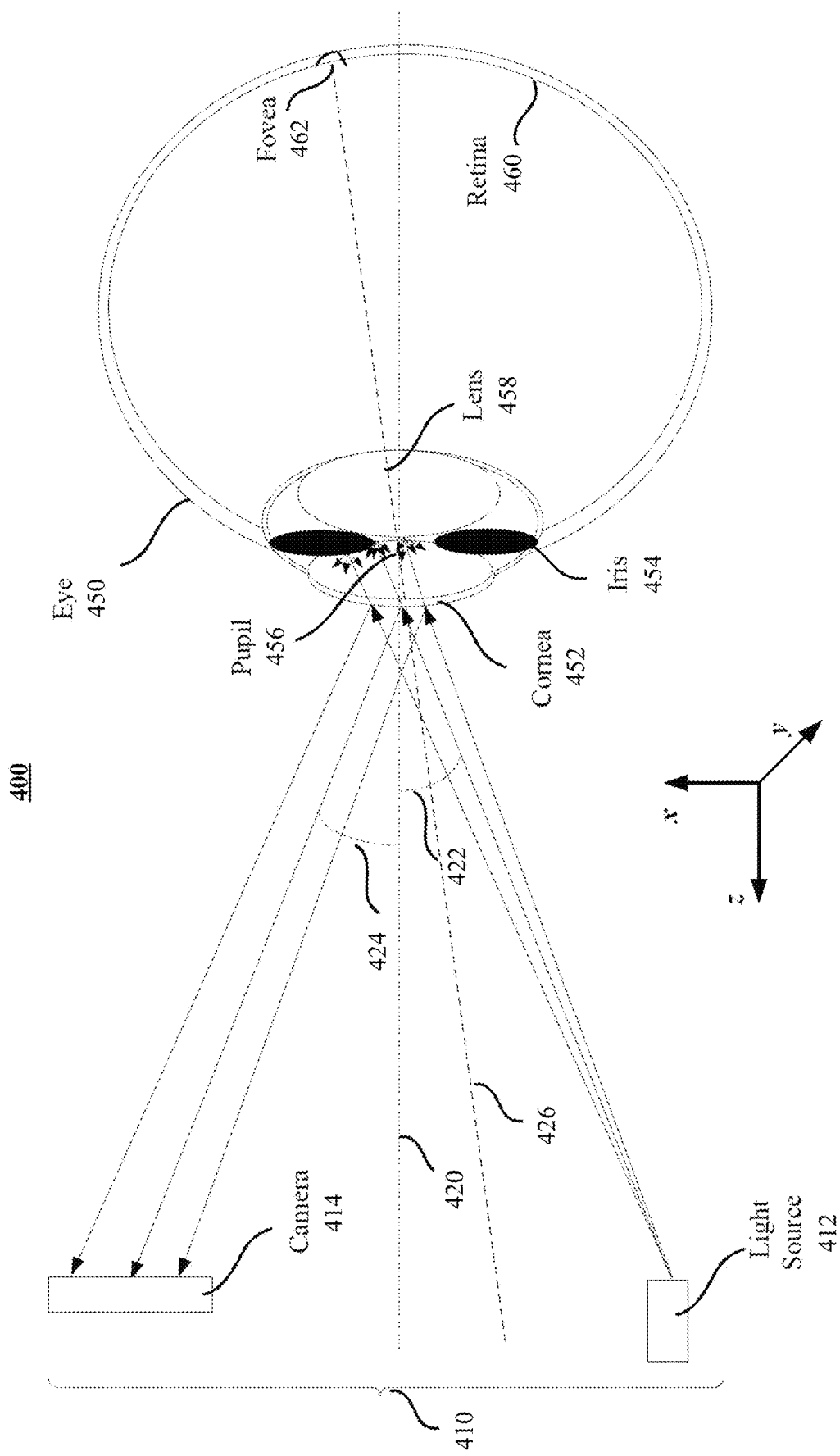
FIG. 4 illustrates an example eye tracking system, in accordance with particular embodiments.

FIG. 4 illustrates light reflections and scattering 400 by an eye 450 during eye tracking using an eye-tracking system 410. Eye-tracking system 410 may include a light source 412 and a camera 414 as described above. In other embodiments, eye-tracking system 410 may include different and/or additional components than those depicted in FIG. 4. Light source 412 may include, for example, a laser, an LED, or VCSELs, and may be mounted at a laser angle 422 relative to a surface normal vector 420 of eye 450. Surface normal vector 420 is orthogonal to a portion of the surface (e.g., cornea 452) of eye 450 illuminated by light source 412. In the example shown in FIG. 4, surface normal vector 420 may be the same as the pupillary axis (also referred to as optical axis, which may be a line passing through the center of pupil 456 and the center of cornea 452) of eye 450. Laser angle 422 may be measured between surface normal vector 420 and a line from a center of the portion of the surface of eye 450 illuminated by light source 412 to a center of the output aperture of light source 412. Camera 414 may be mounted at a camera angle 424 relative to surface normal vector 420 of eye 450. Camera angle 424 may be measured between surface normal vector 420 and a line from a center of the portion of the surface of eye 450 illuminated by light source 412 to a center of the image sensor or light input aperture of camera 414. In some embodiments, a difference between laser angle 422 and camera angle 424 is less than a threshold amount so that camera 414 may capture images via specular reflections of light incident on cornea 452 of eye 450, which may beneficially increase contrast of the resulting image and minimize light power loss and power consumption.

The light emitted by light source 412 may substantially uniformly illuminate a portion of the eye surface (e.g., cornea 452). A portion of the emitted light may be reflected specularly by cornea 452 of eye 450 and captured by camera 414. In some cases, the light incident on eye 450 may propagate into the eye for a small distance before being reflected. For example, at least some portions of the light may enter eye 450 through cornea 452 and reach iris 454, pupil 456, lens 458, or retina 460 of eye 450. Because some interfaces within eye 450 (e.g., surface of iris 454) may be rough (e.g., due to features such as capillaries or bumps), the interfaces within eye 450 may scatter the incident light in multiple directions. Different portions of the eye surface and the interfaces within eye 450 may have different patterns of features. Thus, an intensity pattern of the light reflected by eye 450 may depend on the pattern of features within the illuminated portion of eye 450, which may allow identification of the portions of the eye (e.g., iris 454 or pupil 456) from the intensity pattern.

Camera 414 may collect and project light reflected by the illuminated portion of eye 450 onto an image sensor of camera 414. Camera 414 may also correct one or more optical errors to improve the contrast and other properties of the images captured by the image sensor of camera 414. In some embodiments, camera 414 may also magnify the reflected light. In some embodiments, camera 414 may enlarge the images. The image sensor of camera 414 may capture incident light focused by a lens assembly of camera 414. Thus, camera 414 may effectively capture an image of light source 412 (the emitted light of which is reflected specularly by the cornea of the eye) reflected by the eye, resulting in a "glint" in the captured image. Because of the scattering (diffusive reflections) at some interfaces of the eye, light incident on a point of the image sensor may include light reflected from multiple points within the illuminated portion of eye 450, and thus may be the result of the interference of the light reflected from the multiple points. Thus, in some embodiments, the image sensor of camera 414 may also capture a diffraction or speckle pattern formed by a combination of light reflected from multiple points of the surface of eye 450.

Each pixel of the image sensor may include a light-sensitive circuit that can output a current or voltage signal corresponding to the intensity of the light incident on the pixel. In some embodiments, the pixels of the image sensor may be sensitive to light in a narrow wavelength band. In some other embodiments, the pixels of the image sensor may have a wide-band or multi-band sensitivity. For example, the image sensor of camera 414 may include a complementary metal-oxide semiconductor (CMOS) pixel array, which may be used with light having a wavelength less than about 450 nm. As another example, the image sensor of camera 414 may include an indium gallium arsenide (InGaAs) alloy pixel array or a charge-coupled device (CCD). Such an image sensor may be used with a laser emitting light having a wavelength between about 900 nm and about 1160 nm.

In some embodiments, to determine a position change of eye 450, an eye-tracking module may determine a pixel shift between images. Multiplying the pixel shift by a calibrated distance per pixel may allow the eye-tracking module to determine a distance the surface (e.g., cornea 452) of eye 450 has shifted. For example, if the glint captured in one image is shifted by two pixels relative to the glint captured in a previous image, and each pixel corresponds to a distance of 10 micrometers at the surface of eye 450, the surface of eye 450 may have moved about 20 micrometers.

In some embodiments, eye-tracking techniques used in head-mounted devices may be video-based and may be performed based on appearance or features. For example, the appearance-based techniques may use certain mapping functions to map the entire eye image or a region of interest of the eye image to a gaze direction or point-of-gaze. The mapping function may have a high-dimensional input (e.g., the intensities of image pixels) and a low-dimensional output (e.g., the gaze direction, point-of-gaze, etc.). These mapping functions may be based on machine learning models, such as convolutional neural networks (CNNs).

The feature-based techniques may perform feature extraction and gaze estimation using the extracted features. The features can be any one or more of the following: pupil center, iris center, pupil-iris boundary, iris-sclera boundary, first Purkinje images (reflections off the front surface of the cornea, known as corneal reflections or glints), fourth Purkinje images (reflections of the back surface of the crystalline lens), eye corners, and the like. These features may be extracted using computer vision techniques (e.g., intensity histogram analysis, thresholding, edge detection, blob segmentation, convex-hull, morphological operations, shape fitting, deformable templates, centroiding, etc.) or machine-learning techniques, or any combination. The gaze estimation techniques can be interpolation-based or model-based. The interpolation-based techniques may use certain mapping functions (e.g., second degree bivariate polynomial) to map eye features (e.g., pupil center or pupil center-corneal reflection (PCCR) vector) to the gaze direction. The coefficients of these mapping functions may be obtained through a personal calibration procedure that may involve collecting data while the user fixates at a sequence of fixation targets with known coordinates. This calibration may be performed for each subject and each session, and may sometimes be performed multiple times in each session, because the calibration may be sensitive to slippage of the head-mounted device relative to the head. The mapping functions may then use the calibration data points and interpolation techniques to determine the gaze direction. The model-based methods may use models of the system (e.g., camera(s) and/or light source(s)) and the eye that may include actual physical system parameters and anatomical eye parameters to determine a 3-D gaze from a set of eye features (e.g., pupil boundary and multiple corneal reflections) according to 3-D geometry. Model-based techniques may perform both a one-time system calibration and a one-time personal calibration for each user. The data collection procedure for the personal calibration may be similar to that of the interpolation-based methods.

Alternatively or additionally, the eye-tracking module may determine the position of the eye in a captured image by comparing the captured images with one or more previous images having known positions of the eye. For example, the eye-tracking module may include a database of images that are each associated with a reference eye position. By matching the captured image with a stored image, the eye-tracking module may determine that the eye is at the reference eye position associated with the stored image. In some embodiments, the eye-tracking module may identify a feature in a portion of a captured image. The feature may include a diffraction or optical flow pattern associated with a particular portion of eye 450, such as the pupil or the iris. For example, the eye-tracking module may determine the eye position by retrieving a reference eye position associated with the feature (which was also captured in a reference image), determining a pixel shift between the feature in the captured image and the feature in the reference image, and determining the eye position based on the determined pixel shift with respect to the reference eye position and the calibrated distance per pixel as described above.

As discussed above, camera 414 may effectively capture an image of light source 412 reflected by cornea 452 of eye 450. In some embodiments, the eye-tracking module may determine a gaze direction of the user's eye based on the locations of the images of the light sources (e.g., glints) on cornea 452 in the captured image. The gaze direction may be determined by a foveal axis 426 of the user's eyes, where foveal axis 426 (also referred to as "visual axis") may be a line passing through the center of pupil 456 and the center of fovea 462.

Figure 5:
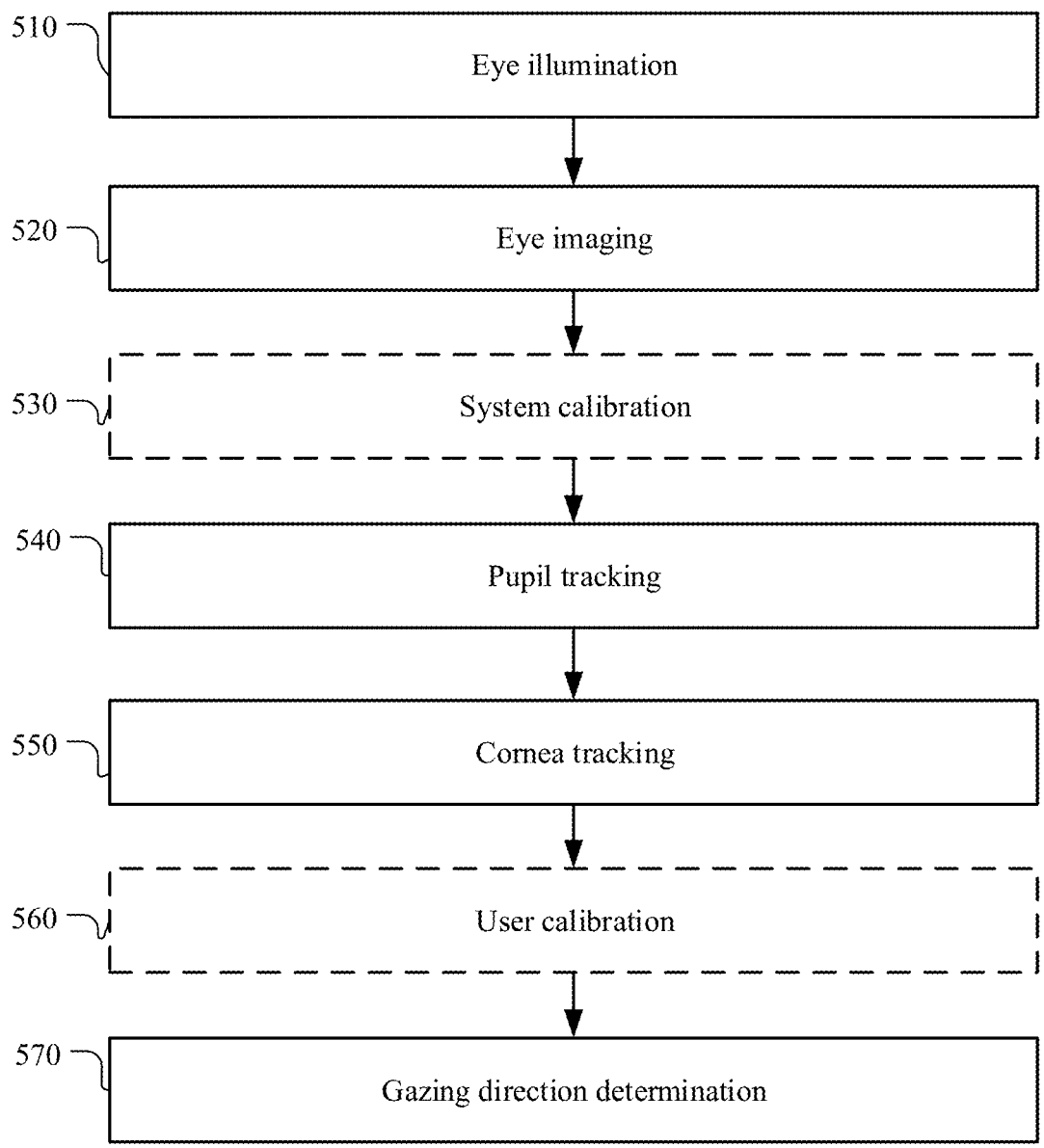
FIG. 5 illustrates an example method for tracking a user's eye position or gaze, in accordance with particular embodiments.

FIG. 5 is a simplified flowchart 500 illustrating an example method for tracking the eye of a user of a system, such as the artificial reality system 100 or the near-eye display system 200 according to certain embodiments. The operations in flowchart 500 may be performed by, for example, the eye-tracking system 410 described above. At block 510, one or more light sources may illuminate the user's eye. In various embodiments, the light sources may be in the field of view of the user's eye or at a periphery of the field of view of the user's eye. In some embodiments, a light source may be located at the periphery of the field of view of the user's eye, and the light from the light source may be guided and directed to the user's eye from locations in the field of view of the user's eye.

At block 520, an imaging device (e.g., a camera) may collect light reflected by the user's eye and generate one or more images of the user's eye. As described above, the cornea of the user's eye may specularly reflect the illumination light, while some portions of the user's eye (e.g., iris) may diffusively scatter the illumination light. The images of the user's eye may include portions (e.g., the iris region and/or the pupil portion) where the contrast may be different due to the scattering of the illumination light. The images of the user's eye may also include glints caused by the specular reflection of the illumination light by the user's cornea.

Figure 6B:
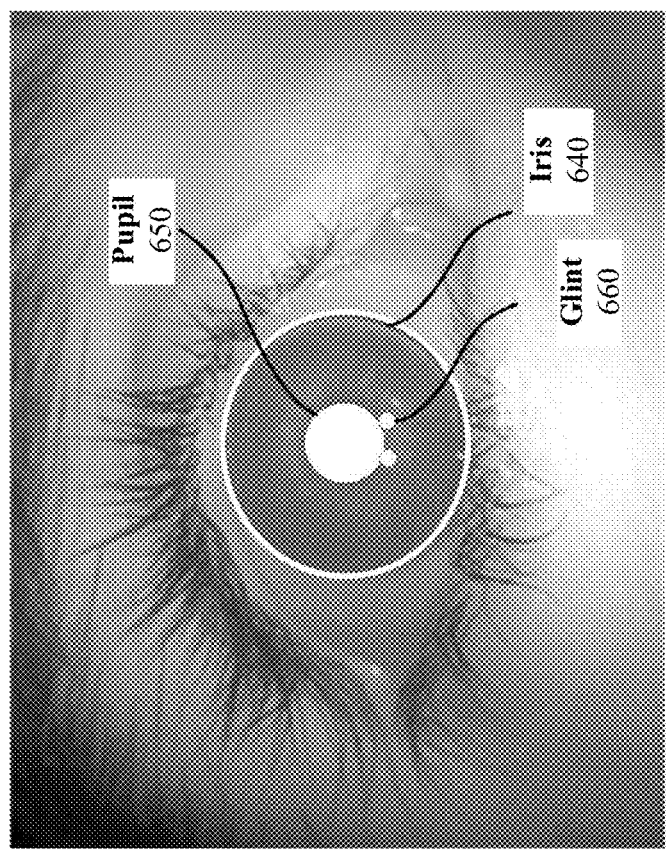
FIGS. 6A-6B illustrate example images depicting a pupil region, an iris region, and glints, in accordance with particular embodiments.
Figure 6A:
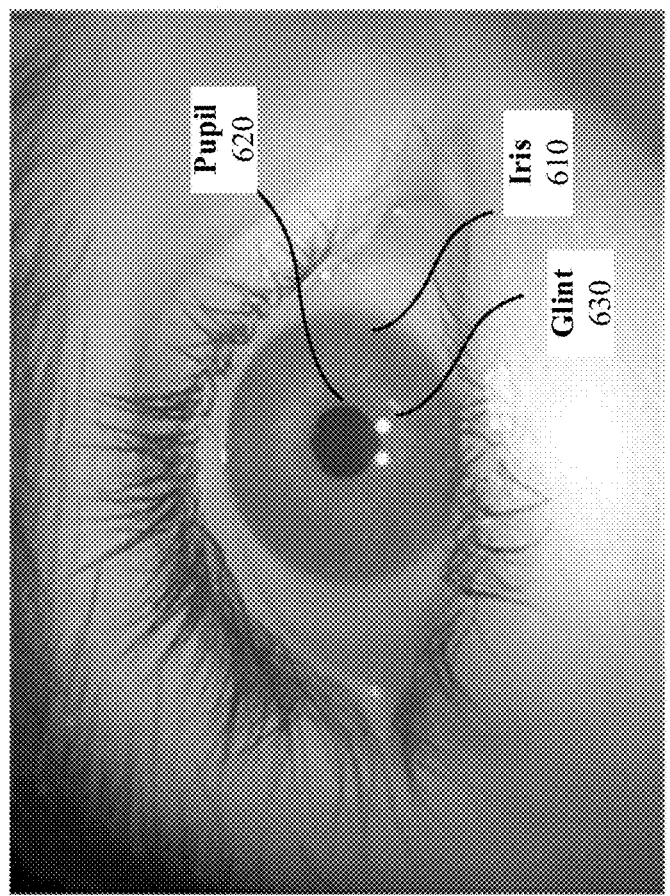

FIG. 6A illustrates an example of an image 600 of a user's eye captured by a camera according to certain embodiments. Image 600 includes an iris region 610, a pupil region 620, and multiple glints 630. Glints 630 may be caused by illumination light specularly reflected off the cornea of the user's eye.

Optionally, at block 530, the eye-tracking system may perform system calibration to improve the precision and accuracy of the eye tracking. The system calibration may include, for example, calibrating the eye tracking optical path (such as extrinsic (e.g., position or orientation) and intrinsic camera parameters), positions of the light sources, the display optical path (e.g., position of the display, extrinsic and intrinsic parameters of the display optics, etc.)

At block 540, the location of the center of the pupil of the user's eye may be determined based on the scattering of the illumination light by, for example, the iris of the user's eye. As described above, the boundaries of the pupil and/or the iris may be determined based on image segmentation of the pupil region in the captured image as shown in FIG. 6A. Based on the boundaries of the pupil, the location of the center of the pupil may be determined.

At block 550, the position of the cornea of the user's eye may be determined based on the locations of the glints in the captured image of the user's eye as shown in FIG. 6A. As described above, the locations of the glints may be determined using, for example, a Gaussian centroiding technique. The accuracy and precision of the determined locations of the glints may depend on the locations of the light sources (or virtual or effective light sources). Based on the locations of two or more glints, the position of the cornea may be determined using, for example, nonlinear optimization and based on the assumption that the cornea (in particular, the corneal apex) is close to a sphere.

FIG. 6B illustrates an example of another image 605 including an identified iris region 640, an identified pupil region 650, and examples of glint regions 660 identified in image 600 of the user's eye according to certain embodiments. As illustrated, edges of iris region 640 and pupil region 650 are identified. The center of pupil region 620 may then be determined based on the edges of pupil region 650 and/or iris region 640. The locations of glints 630 can also be determined based on the locations of glint regions 660 identified in image 605. Based on the locations of glint regions 660, the position of the center of the cornea may be determined.

Optionally, at block 560, the eye-tracking system may perform user calibration to determine certain eye calibration parameters for improving the precision and accuracy of eye tracking as described above in reference to FIG. 4. The user calibration may include, for example, determining the eye model parameters (e.g., anatomical eye parameters) or the coefficients of some mapping functions that may not depend on a particular eye parameter. Other examples of the eye calibration parameters may include an estimated average eye radius, an average corneal radius, an average sclera radius, a map of features on the eye surface, and an estimated eye surface contour. As described above, a kappa angle between the pupillary axis (optical axis) and the foveal axis (visual axis) of the use's eye may be different for different users, and thus may need to be calibrated during the calibration. In some embodiments, the calibration may be performed by displaying a set of target points distributed over a display screen according to a certain pattern, and the user is asked to gaze at each of the target points for a certain amount of time. The camera may capture the corresponding eye positions for the target points, which are then mapped to the corresponding gaze coordinates or directions, and the eye-tracking system may then learn the mapping function or the model parameters. In some embodiments, the calibrations at block 530 and 560 may only be performed once when the near-eye display system is put on or moved.

At block 570, the gaze direction of the user's eye may be determined based on, for example, the location of the center of the pupil and the position of the center of the cornea. In some embodiments, the pupillary axis of the use's eye may be determined first and may then be used to determine the foveal axis (or line of sight, gaze direction, or visual axis) of the user's eye, for example, based on an angle between the pupillary axis and the foveal axis.

In some embodiments, based on the gaze direction (and thus the center of the field of view) of the user's eye and the sensitivity of human eyes at different regions of the retina, the system (e.g., artificial reality system 100) may determine the luminance levels for the individual light sources or grayscales in different display zones of the system that correspond to different zones on the retina of a user's eye. The individual light sources or grayscales in the different display zones may then be controlled to emit at the different luminance levels. As described above, human eyes are generally less sensitive to light from large viewing angles with respect to the foveal axis. The sensitivity may peak at the foveal zone and quickly decrease outside of the foveal zone. Therefore, display zones of a display panel that may be imaged onto regions of the retina farther away from the fovea may not be very noticeable to a user's eye even if these display zones have high luminance levels or high light intensities. As such, light sources (e.g., micro-LEDs or AMOLEDs) in these display zones may be controlled to emit light at lower luminance levels or reduced grayscales to reduce the power consumption of the system, with no or minimum impact on the user experience. Light sources in a display zone that may be imaged onto a zone of the retina including the fovea may be controlled to emit at a higher luminance level or higher grayscales (or brightness). By reducing the luminance levels of the light sources or grayscales in some display zones of the display panel that may have less impact on user experience, the power consumption of the system can be reduced.

System Peak Power Management

Figure 7:
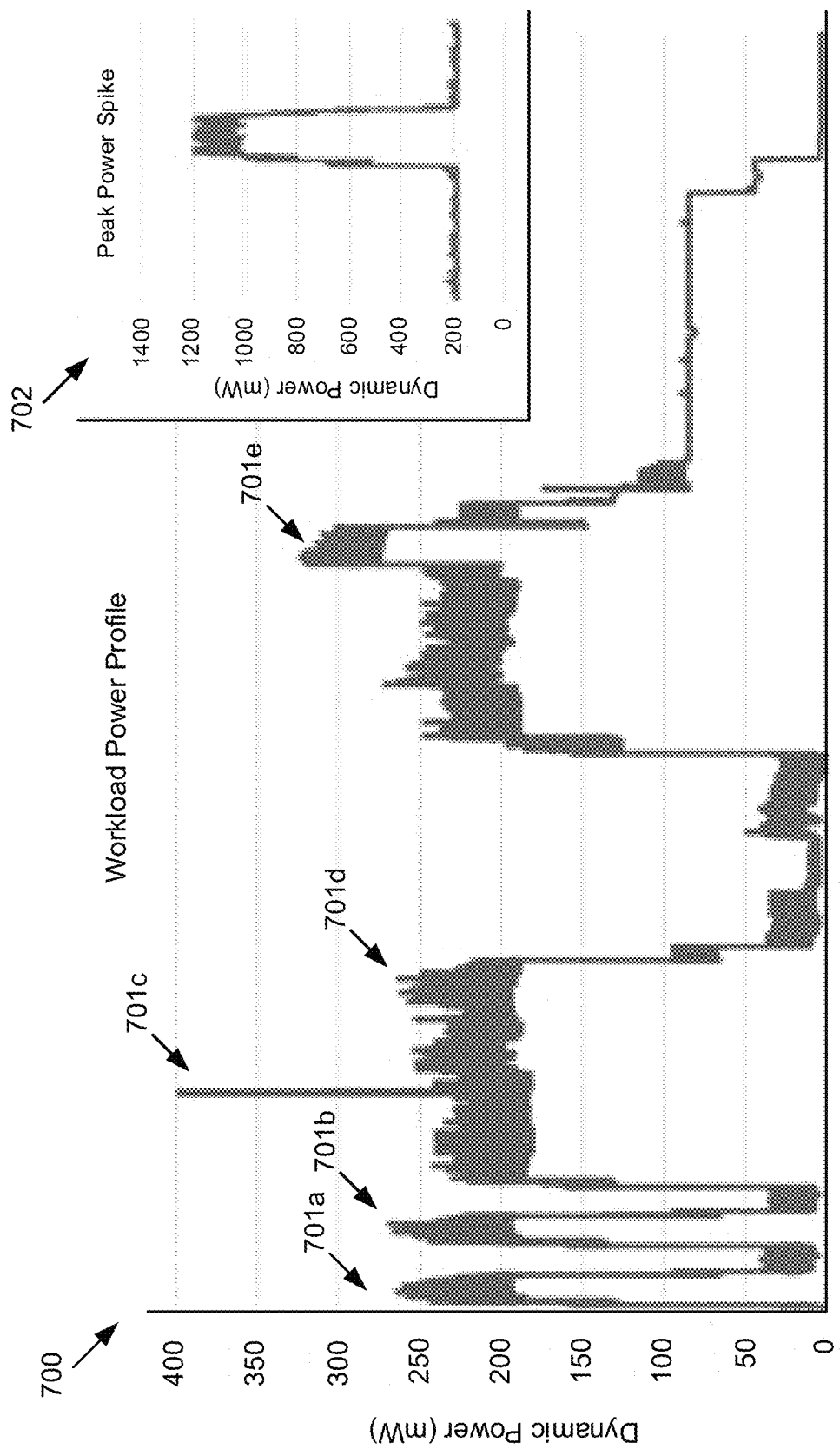
FIG. 7 illustrates an example workload power profile showing average power consumed by one or more system components over time, in accordance with particular embodiments.

System peak power management is responsible for ensuring that system peak power in the systems (e.g., artificial reality system 100 or near-eye display system 200) is not exceeded to prevent battery burnout and abrupt system shutdown. Such unexpected shutdowns may result in poor user experience. Peak power events occur when individual components of a system (e.g., system 100 or 200) execute transient workload with very high activity ratio or due to utilization/execution of multiple resources at the same time. Other aspects like current system temperature, leakage, and operating frequency further contribute to peak power spikes. Such peak power events are transient in nature and typically result in power spikes that are much higher than average workload execution and power. FIG. 7 illustrates an example workload power profile 700 showing average power consumed by one or more components of the system over time and an example peak power spike 702 that may occur during period of high activity or parallel/concurrent processing by the one or more components of the system. For instance, some system components may have more sustained or long duration high activity intervals that contribute to transient system peak power spikes 701a, 701b, 701c, 701d, and 701e. Examples include display or audio components where high content fill rate/grayscale or higher speaker volume may increase overall system power for longer intervals making transient peak power spikes or events much more likely to occur. Therefore, it is necessary to manage system peak power to avoid occurrence of these peak power spikes or peak power events in the system (e.g., artificial reality system 100). Also, given that a display component is often one of the biggest consumers of peak power budget in the system, particularly in AR glasses, it is particularly important to manage display peak power and ensure that the display component operates within an allotted display peak power budget while providing the best user experience and image quality.

FIG. 8 illustrates an example flow diagram 800 for overall system peak power management including display peak power management. As illustrated, a fuel gauge 804 may determine a system peak power 805 and provide it to a system peak power manager 806. The system peak power manager 806 may be responsible for ensuring that the system peak power 805 is not exceeded to prevent battery burnout and abrupt system shutdown. The system peak power 805 may indicate a total amount of power (e.g., current) that can be drawn by the system to perform its functionalities by one or more system components. As an example, the fuel gauge 804 may determine 10 watts as system peak power 805 that can be used by the system components. In some embodiments, in addition to the system peak power 805, the fuel gauge 804 may determine one or more of battery voltage or resistance. In some embodiments, the system peak power 805 determined by the fuel gauge 804 is based on the measured battery voltage or resistance.

In particular embodiments, the fuel gauge 804 may determine the system peak power 805, the battery voltage, and/or resistance based on one or more of a current battery state of charge 801, battery wear out condition 802, and a system temperature 803. The battery state of charge 801 indicates how charged the system battery is. For example, the battery state of charge 801 may indicate that the battery is 50% charged. The battery state of charge 801 for determining the system peak power 805 is important as the battery voltage is a function of the state of charge. So when the system starts at 100% device of charge, the battery voltage can be, for example, 4 volts. And as the battery discharges to 50%, the battery voltage drops, for example, to 3.7 volts. But as the battery is discharged further to 20%, the voltage may drop down to 3 volts. In some embodiments, the system power delivery has a minimum voltage requirement ($V_{min}$). As battery voltage ($V_{bat}$) decreases with lower RSOC, the allowed drop in current may be given by $IR=V_{bat}-V_{min}$, where I is current, V is voltage, and R is resistance. Therefore, the peak current needs to be reduced. In particular embodiments, the peak power or peak current that the system can draw from the battery changes dynamically with the battery state of charge 801.

Another aspect that the fuel gauge 804 takes into account when determining the system peak power 805 is the battery wear out 802. For instance, as the battery gets older, its internal components or associated parts degrade, and so the amount of peak power and the amount of voltage it delivers also degrades. Therefore, battery wear out 802 needs to be taken into account. Yet another aspect that the fuel gauge 804 takes into account is the system temperature 803 (e.g., battery temperature or path resistance from the battery to power delivery component). The system peak power dynamically changes with the system temperature 803. For instance, as the temperature drops, the resistance goes up and so the peak current allowed in the system needs to be reduced at a given battery voltage. By way of an example, if a user goes from Texas to skiing in Colorado, where the temperature is relatively lower, one can expect resistance to go up. In other words, resistance may double between warm and cold weather conditions. As such it is important to monitor the current system temperature 803 when determining the system peak power 805.

In particular embodiments, the fuel gauge 804 provides the system peak power 805 and other battery-related information (e.g., battery voltage, resistance) determined based on the battery charge 801, battery wear out 802, and system temperature 803 to the system peak power manager 806. The system peak power manager 806 may allocate peak power budgets to one or more system components based on the system peak power 805 and other system information, such as system state 808, system workload changes 810, and system telemetry 812. The system state 808 may describe any change in component peak power allocation due to change in power state, mode of operation, or scheduling. In some embodiments, the system state 808 may indicate components of the system that are currently active. System workload 810 may describe an amount of processing/work being done or to be done by the active components of the system. In some embodiments, the system workload 810 may include changes in application behavior where a different budget distribution may improve quality or system performance. System telemetry 812 may include measurements or information associated with the various system components. As an example, system telemetry 812 may include information provided by one or more sensors of the system.

The system peak power manager 806 may use the system peak power 805, the system state 808, and the system workload 810 together with the system telemetry 812 to allocate peak power budgets, including power budget 814 and display peak power budget 820, to individual domains and components. By way of an example and without limitation, the system peak power manager 806 may receive 10 watts as the system peak power 805 from the fuel gauge 804, and may allocate that 10 watts to different system components, such as 3 watts to audio component for sound, 2 watts to wireless component for internet connectively, 1 watt to camera component for image/video capture, and 4 watts to display component for display.

A domain may include multiple components that share a common peak power budget, such as power budget 814, which is managed at the domain level. Each component and domain may have corresponding peak power policies, including component peak power policy 816 and domain peak power policy 818. The component peak power policy 816 and domain peak power policy 818 may convert the power budget 814 to control knobs and settings that ensure peak power budget 814 is not exceeded while providing the best quality and performance.

As illustrated, the system peak power manager 806 may separately provide the display peak power budget 820 to a display peak power manager 822. As discussed elsewhere herein, a display component may often be one of the biggest consumers of peak power budget in a system, particularly in AR glasses, and therefore it is particularly important to manage display peak power and ensure that the display component operates within the allotted display peak power budget 820. The display peak power manager 822 may be configured to ensure that the display component of the system operates within the given display peak power budget 820. For example, given the display peak power budget of 4 watts, the display peak power manager 822 is responsible to make sure that the display component of the system when rendering a display does not go beyond 4 watts. The display peak power manager 822 may include a display peak power management policy 828 to ensure this. For instance, the display peak power management policy 828 may define or outline power requirements and display properties for displaying different types of content at different situations and for satisfying the display peak power budget 820.

In particular embodiments, the display peak power management policy 828 may configure one or more display-controlling parameters 830a, 830b, ... 830n to meet display peak power allocation or the display peak power budget 820. In particular embodiments, the display peak power management policy 828 uses current graphics or display workload 824 and display telemetry 826 to determine a combination of display-controlling parameters 830 (also individually and collectively herein referred to as 830). The display workload 824 may indicate an amount of content currently being displayed or to be displayed by the display component of the system. The display telemetry 826 may include, for example and without limitation, average grayscale values associated with content currently being displayed by the display component, an estimated head pose of a user wearing the system (e.g., head-mounted display device), a fill rate of the display component, an estimated eye position of the user, a frequency of head movement, etc.

The display-controlling parameters 830 are parameters for maintaining the display component to operate within the display peak power budget 820. In particular embodiments, these display-controlling parameters 830 may define how the display component should render a display at run time in order to meet the peak power requirements without substantially degrading user viewing experience or display quality. In particular embodiments, the display-controlling parameters 830 may be used to implement a gaze-based grayscale control (also interchangeably referred to herein as a gaze-based display) to meet the display peak power budget 820, as discussed in detail below in reference to FIG. 9. For instance, gaze-based grayscale control approach may be used to meet the peak power allocation (e.g., display peak power budget 820) by adjusting one or more of grayscale pixel values in periphery regions or by adjusting a size of a fovea region. The gaze-based grayscale control approach may set an upper limit or clip grayscale pixel values that are outside of the fovea region to meet peak power allocation. The number of periphery regions may be tuned to gradually dim the periphery to minimize impact on image quality. In addition, the size of the fovea region may be controlled or adjusted as well based on current display power budget. In particular embodiments, to implement the gaze-based grayscale control or gaze-based display, the display-controlling parameters 830 may define, for example and without limitation, 1) the size of the fovea region specified as a bounding box and aligned on tile boundary, 2) number of peripheral regions (up to a max value) and their bounding boxes, and 3) grayscale for each of the peripheral regions. It should be understood that the present disclosure is not limited to these display-controlling parameters 830 and other display-controlling parameters may be determined and used to meet the display peak power budget 820. For instance, some of the other display-controlling parameters may define adjustments with respect to a display fill rate (e.g., horizontal fill rate), pulse-width modulation (PWM) values for adjusting display brightness, grayscale, rolling start window (RSW), and stop display roll. Each of this is discussed in detail below:

Display fill rate—display fill rate is the rate at which the number of pixels that gets illuminated in a rolling display. A display-controlling parameter 830, in accordance with the display peak power management policy 828, may restrict or limit maximum fill rate if current workload has low average fill rate. In some embodiments, the peak power reduces with decreasing fill rate. Therefore for usages with small fill rates, controlling/adjusting the display fill rate may be effective in limiting display peak power with virtually no impact on quality or user experience.

Display brightness—pulse-width modulation (PWM) is one of the ways by which display brightness can be adjusted. A display-controlling parameter 830, in accordance with the display peak power management policy 828, may limit display brightness by either reducing PWM period or globally scaling per-color pixel grayscale to meet the display peak power budget 820.

Pixel Grayscale—color values of individual pixels in a frame that represent rendered content. Reducing the grayscale of all or subset of pixels may reduce effective PWM pulse length and therefore display peak power. The grayscale may be adjusted globally for all pixels, per surface during color conversion stage, or by stage GPU as a post-processing step. In particular embodiments, only the grayscale of pixels in the periphery outside of the fovea region is affected. In some embodiments, the global property of reducing PWM period or pixel grayscale may have significant quality impact especially for usages where average grayscale is well below maximum intensity allowed by the peak power limit. To address this issue, a display-controlling parameter 830 may limit or restrict grayscale values to be changed for only those pixels whose grayscale exceeds maximum grayscale value allowed by the display peak power management policy 828. For instance, rather than reducing the grayscale of all the pixels, only pixels whose grayscale value exceeds beyond a threshold value are reduced. This may improve image quality as it still limits peak power while reducing grayscale of only higher intensity pixels.

Rolling start window (RSW)—increasing rolling start window by changing row to row time while keeping the same PWM period may reduce the number of active rows in the display roll and therefore display peak power requirements. In particular embodiments, a display-controlling parameter 830, in accordance with the display peak power management policy 828, may adjust RSW based on a display peak power budget allocation (e.g., display peak power budget 820).

Stop display roll—in certain situations (e.g., when battery is at a critical level), the display may be suspended or illumination stopped very quickly (within row to row time). In particular embodiments, display illumination for remaining rows in a display frame may be stopped i.e., no more rows will be illuminated in the current display frame. The rows that are currently being displayed may continue to consume power for PWM period specific to each color channel.

In particular embodiments, the display peak power manager 822 may provide the above discussed display-controlling parameters 830 (e.g., display-controlling parameters to implement gaze-based grayscale control or gaze-based display) to a display rendering module (e.g., display rendering module 910), which then uses these parameters 830 to adjust or correct a display to meet the display peak power budget 820, as discussed in further detail below with respect to FIG. 9.

Gaze-Based Grayscale Control for Display Peak Power Management

Gaze-based grayscale control approach may be used to meet the peak power allocation (e.g., display peak power budget 820) by adjusting one or more of grayscale pixel values in periphery regions or by adjusting a size of a fovea region. For instance, the gaze-based grayscale control approach may set an upper limit or clip grayscale pixel values that are outside of the fovea region to meet peak power allocation. The number of periphery regions may be tuned to gradually dim the periphery to minimize impact on image quality. In addition, the size of the fovea region may be controlled or adjusted as well based on current display power budget. A computing system (e.g., eye tracking system 410) may determine current fovea region and one or more periphery regions for this adjustment by tracking user's eye gaze or position. In particular embodiments, the fovea region is rectangular centered at the user's eye gaze. The size of the fovea region, number of periphery regions, and grayscale values in each of the regions may be configured or adjusted based on the one or more display-controlling parameters 830. In some embodiments, maximum grayscale values or level may be set for each region. In other embodiments, the grayscale values may be uniformly reduced for each pixel. Setting maximum grayscale values for each region may be used to enforce peak power limits while uniformly reducing grayscale for each pixel in the region may be used to reduce display average power in addition to limiting peak power.

Gaze-based grayscale control approach has several advantages for display peak power management. Some of the advantages may include, for example and without limitation, (1) fovea region provides an upper bound on the number of white/100% intensity pixels in the display, (2) the periphery region's maximum grayscale may be adjusted to meet peak power requirements with minimum image quality degradation, (3) most augmented reality (AR) content fits into the fovea region and therefore may not see any image quality degradation. In some embodiments, in the absence of gaze-based control approach, all AR content may be affected or adjusted by global parameters, such as PWM period, grayscale gain, RSW, etc. as discussed above.

FIG. 9 illustrates an example flow diagram 900 for gaze-based grayscale control or gaze-based display for display peak power management. In particular, the flow diagram 900 illustrates steps for adjusting a rendered display frame based on a user's eye gaze and display-controlling parameters. An eye tracking system 902 (e.g., eye tracking system 410 as discussed above in reference to FIG. 4) may determine user's eye gaze or position 906a of a first eye (e.g., left eye) using a camera 904a and user's eye gaze or position 906b of a second eye (e.g., right eye) using a camera 904b. Detailed description regarding how the eye tracking system 902 works for gaze determination is covered above in reference to at least FIGS. 4 and 5. The eye-tracking system 902 sends the eye positions 906a and 906b to a display rendering module 910, which is responsible for rendering a display frame. As depicted, the rendering module 910 may include image processors 912a and 912b and display correction blocks (DCB) 916a and 916b. Each image processor 912a, 912b may be configured to render a display frame for each display screen of the device (e.g., device 100 or 200) based on each eye position 906a, 906b. For instance, the image processor 912a may render a display frame 914a for left display screen of the device based on the left eye position 906a and render a display frame 914b for right display screen of the device based on the right eye position 906b. Detailed description regarding how an image is processed for each eye is covered above in reference to at least FIG. 3. Each of the image processors 912a, 912b may send their rendered display frame 914a, 914b to DCB 916a, 916b. The DCBs 916a and 916b may be configured to adjust or correct rendered display frames received from the image processors 912a and 912b. For instance, a computing component associated with the DCB 916a may be configured to adjust or correct the rendered display frame 914a for the left display screen by performing one or more of fovea region adjustment 918a or grayscale adjustment 920a. Similarly, a computing component associated with the DCB 916b may be configured to adjust or correct the rendered display frame 914b for the right display screen by performing one or more of fovea region adjustment 918b or grayscale adjustment 920b. The benefit of doing these adjustments in the DCBs 916a and 916b is lower eye tracking latency and thus smaller fovea size. It should be noted that the fovea region adjustment and/or the grayscale adjustment discussed herein is not limited to be performed by the DCBs 916 and may be performed by the image processors 912 as part of rendering (e.g., foveated rendering). For instance, the image processors 912a and 912b may be configured to adjust grayscale of different periphery regions.

In particular embodiments, each of the components of the DCB 916*a* and 916*b* may perform its fovea region adjustment 918 or grayscale adjustment 920 based on the display-controlling parameters 830. For instance, as discussed above in reference to FIG. 8, the display peak power manager 822 may receive display peak power budget 820 (e.g., 4 watts) from the system peak power manager 806 and analyze current display workload 824 and display telemetry 826. Using the display peak power budget 820, the display workload 824, and the display telemetry 826 and in accordance with the display peak power management policy 828, the display peak power manager 822 may determine one or more display-controlling parameters 830*a*, 830*b*, 830*n* for maintaining a display component of the device (e.g., device 100 or 200) to operate within the display peak power budget 820. As discussed elsewhere herein, the display-controlling parameters 830 may define, for example and without limitation, 1) the size of the fovea region specified as a bounding box and aligned on tile boundary, 2) number of peripheral regions (up to a max value) and their bounding boxes, and 3) grayscale for each of the peripheral regions. It should be understood that the present disclosure is not limited to these display-controlling parameters 830 and other display-controlling parameters may be determined and used to meet the display peak power budget 820. As an example, rolling start window (RSW), display fill rate, grayscale gain, pulse-width modulation (PWM) values, etc. may be adjusted individually or in combination to meet the display peak power 820. In particular embodiments, the display peak power management policy 828 may determine the values for these display-controlling parameters 830 based on the provided display peak power budget 820 and set these values in each of the DCB 916*a* and 916*b*.

In particular embodiments, a computing component associated with each of the DCB 916*a* and 916*b* may receive one or more display-controlling parameters 830*a*, 830*b*, . . . 830*n* from the display peak power manager 822, determine current fovea region and one or more periphery regions based on current eye position 906*a* (or eye position 906*b*), and perform one or more of fovea region adjustment 918*a* (or fovea region adjustment 918*b*) or grayscale adjustment 920*a* (or grayscale adjustment 920*b*) in the rendered display frame 914*a* (or rendered display frame 914*b*) to ensure that the display component of the device operates within the allotted display peak power budget 820. In some embodiments, the eye positions 906*a* and 906*b* and therefore fovea and periphery regions may change from the last time based on which display frames 914*a* and 914*b* were rendered. As such, the rendered display frames 914*a* and 914*b* need to be corrected based on current fovea and periphery regions and in order to satisfy current display peak power budget 820.

Adjusting a rendered display frame for an eye is now described with respect one of the DCBs, such as DCB 916*a*. However, it should be understood that similar description and process applies to DCB 916*b* in order to adjust a rendered display frame 914*b* for the other eye. As illustrated, the DCB 916*a* may receive user's current gaze or eye position 916*a* and based on the current user's eye position 906*a*, the computing component of the DCB 916*a* may determine a current fovea region and one or more periphery regions of the eye. After determining the current fovea region and one or more periphery regions, the computing component of the DCB 916*a* may determine whether fovea region adjustment 918*a*, grayscale adjustment 920*a*, a combination of 918*a* and 920*a*, or some other adjustment (e.g., rolling start window adjustment, display roll time adjustment, PWM values adjustment, etc.) need to be performed in order to meet the display peak power budget 820.

Figure 10:
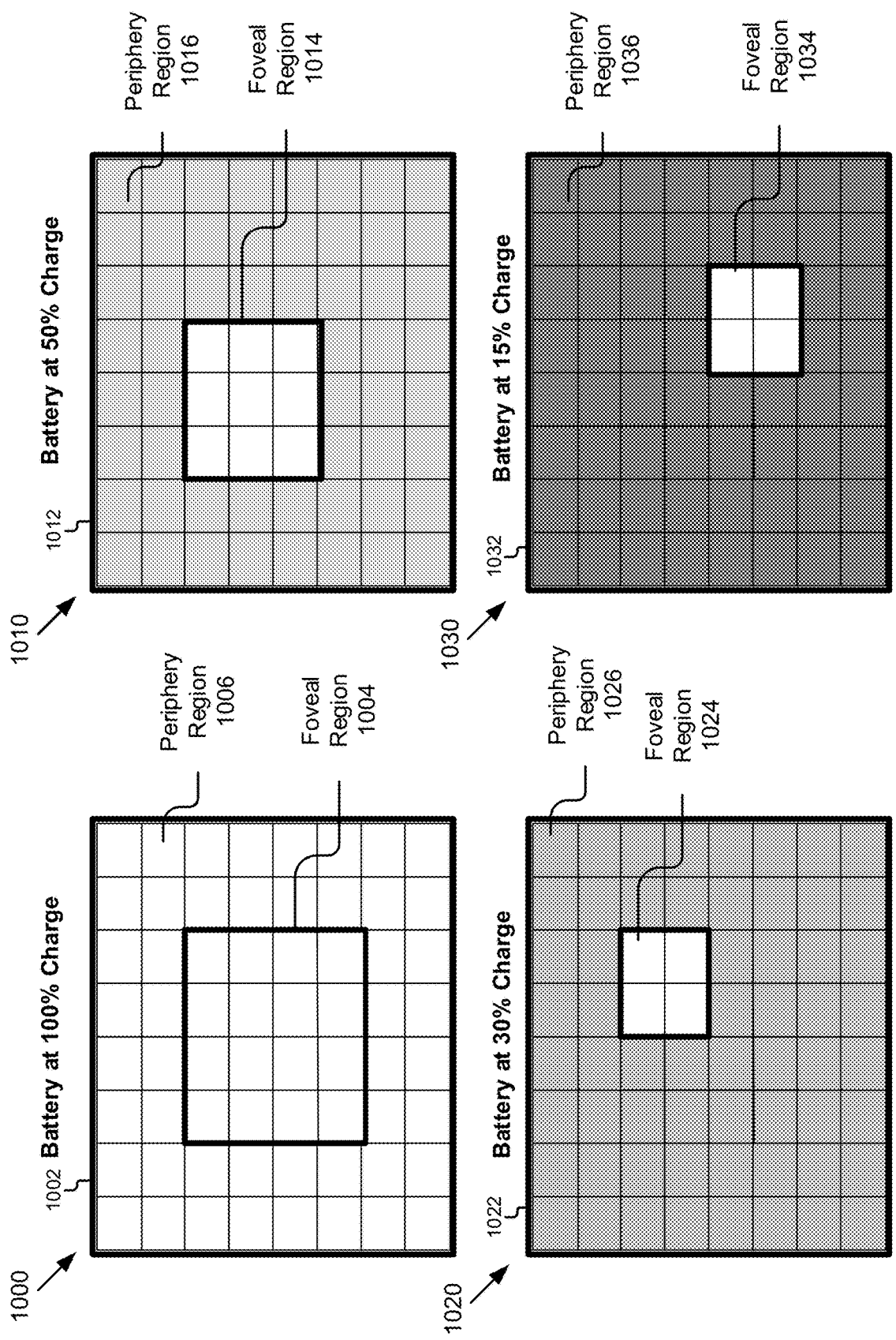
FIG. 10 illustrates an example fovea region adjustment and grayscale adjustment for different battery state of charge scenarios.

In particular embodiments, fovea region adjustment 918*a* or 918*b* may include adjusting (e.g., reducing) the size of the current fovea region to meet the current display peak power budget 820, as shown and discussed in reference to FIG. 10. For instance, a display-controlling parameter 830 may define that the size of the fovea region should be reduced to 50% from the current fovea region size in order to the meet the current display peak power budget 820, and the computing component of the DCB 916*a* may adjust the current fovea region size accordingly.

In particular embodiments, grayscale adjustment 920*a* or 920*b* may include adjusting grayscale values for pixels in the one or more periphery regions. In one embodiment, adjusting the grayscale in a periphery region may include reducing color intensities of the pixels or display brightness. For instance, a display-controlling parameter 830 may define that the grayscale values for pixels in the one or more periphery regions should be reduced down to 40% in order to the current display peak power budget 820, and the computing component of the DCB 916*a* may adjust the grayscale values in the periphery region(s) accordingly. In particular embodiments, the computing component of the DCB 916*a* may adjust the grayscale values of pixels either in a clip mode or in a scale mode. For instance, in the clip mode, the display-controlling parameter 830 may define an upper limit or maximum grayscale value for pixels, and those pixels in the periphery region(s) that are above or beyond the maximum grayscale value are clipped or adjusted to the maximum allowed grayscale value. In the scale mode, grayscale values for all pixels in a periphery region may be uniformly reduced to the grayscale value defined by the display-controlling parameter 830. In some embodiments, grayscale values for individual pixels in a periphery region may also be adjusted to meet the display peak power budget 820.

FIG. 10 illustrates an example fovea region adjustment and grayscale adjustment for different battery state of charge scenarios 1000, 1010, 1020, and 1030. As illustrated, in a first scenario 1000, the battery is 100% charged and a display frame 1002 is rendered with original size of a fovea region 1004 and without any grayscale adjustment in the periphery region 1006. In a second scenario 1010, the battery is 50% charged and the original rendered display frame 1002 is adjusted, for example in the DCB, to generate an adjusted rendered frame 1012, where the size of the original fovea region 1004 is reduced to 50% as represented by fovea region 1014 and the grayscale values are also reduced down to 50% as represented by periphery region 1016. In a third scenario 1020, the battery is 30% charged and the original rendered display frame 1002 is adjusted, for example in the DCB, to generate an adjusted rendered frame 1022, where the size of the original fovea region 1004 is reduced to 25% as represented by fovea region 1024 and the grayscale values are also reduced down to 25% as represented by periphery region 1026. In a fourth scenario 1030, the battery is now only 15% charged and the original rendered display frame 1002 is adjusted, for example in the DCB, to generate an adjusted rendered frame 1032, where the size of the original fovea region 1004 is reduced to 25% (same as third scenario 1020) as represented by fovea region 1034 but the grayscale values are further reduced down to 15% as represented by periphery region 1036. Note that that size of the fovea regions 1024 and 1034 are the same when the battery is at 30% charge and 15% charge. This is because further reducing the size of the fovea region may considerably degrade image quality (e.g., AR content) and impact user experience. As such, the fovea region may be adjusted up to a certain limit, but the grayscale values can be further reduced in order to the meet a display peak power budget, as shown in the fourth scenario 1030. In particular embodiments, one or more display-controlling parameters 830 may define the fovea region bounding boxes or sizes in such a way that most of the AR content may fit into the adjusted fovea regions 1014, 1024, and 1034 and therefore a user may not see any image quality degradation.

Figure 11:
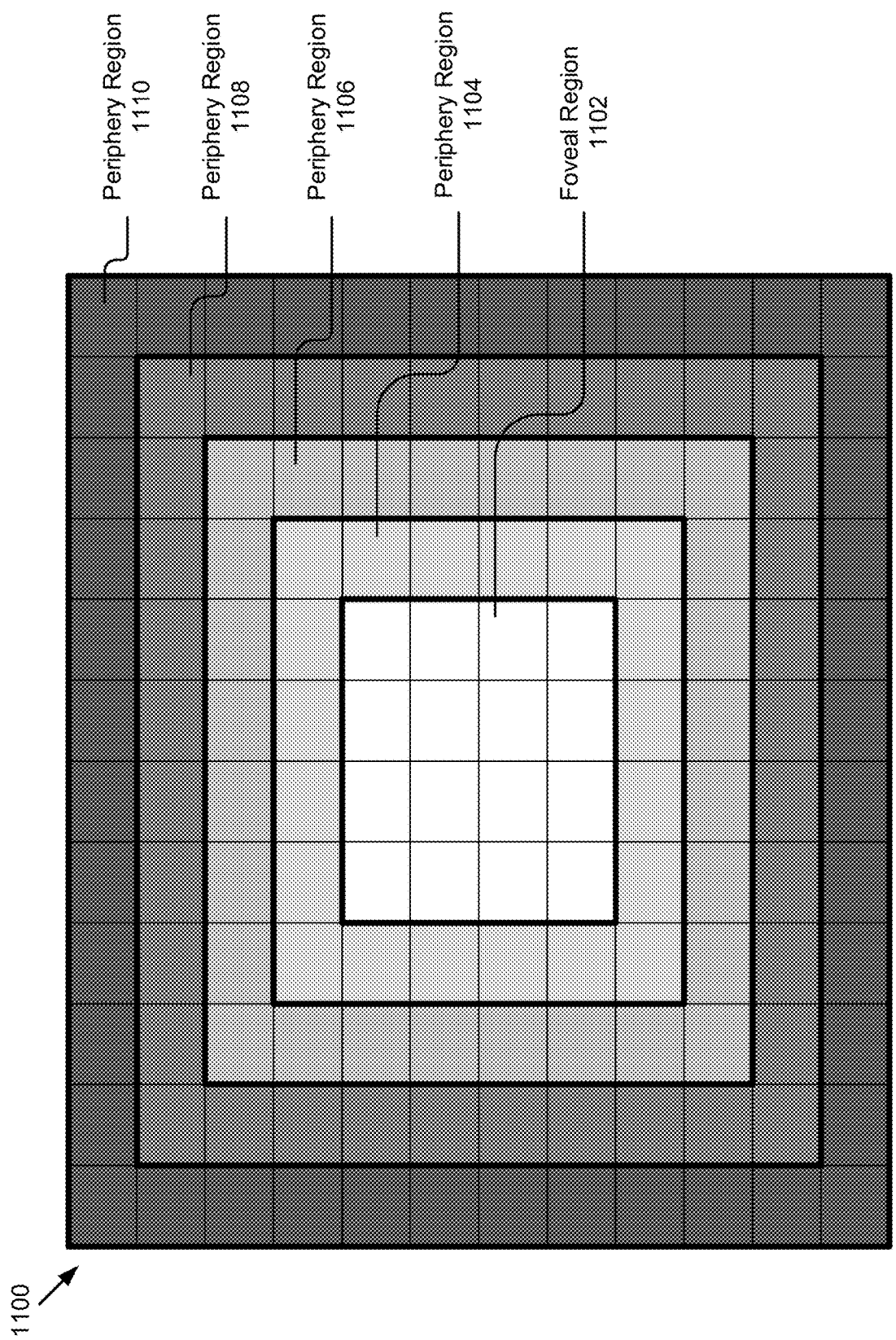
FIG. 11 illustrates different grayscales for different periphery regions.

In some embodiments, grayscale values for pixels in each periphery region may be different. For instance, one of the display-controlling parameters 830 may define the maximum number of periphery regions along with their bounding boxes and another display-controlling parameter 830 may define grayscale for each of these periphery regions. FIG. 11 illustrates different grayscales for different periphery regions. One of the display-controlling parameters 830 may define maximum of four periphery regions 1104, 1106, 1108, and 1110 when rendering a display frame 1100. As depicted, content in fovea region 1102 is displayed at 100% grayscale (i.e., there is no grayscale adjustment in the fovea region 1102). Grayscale values for pixels in a first periphery region 1104 is reduced by 15% (or in other words grayscale reduced to 85%). Grayscale values for pixels in a second periphery region 1106 is reduced by 25% (or in other words grayscale reduced to 75%). Grayscale values for pixels in a third periphery region 1108 is reduced by 60% (or in other words grayscale reduced to 40%). Grayscale values for pixels in the last or fourth periphery region 1110 is reduced by 80% (or in other words grayscale reduced to 20%).

Based on one or more of the fovea region adjustment 918a, grayscale adjustment 920a, or some other adjustment as instructed by the one or more display-controlling parameters 830a, 830b, . . . 830n, a computing component associated with the DCB 916a may generate an adjusted rendered display frame 922a. Similarly, based on one or more of the fovea region adjustment 918b, grayscale adjustment 920b, or some other adjustment as instructed by the one or more display-controlling parameters 830a, 830b, . . . 830n, a computing component associated with the DCB 916b may generate an adjusted rendered display frame 922b. Both the adjusted rendered frames 922a and 922b meet the display peak power budget 820. The display rendering module 910 may use these adjusted rendered frames 922a and 922b to generate a visual scene 924 for display on a display screen of the device, such as the device 100 or device 200.

Figure 12:
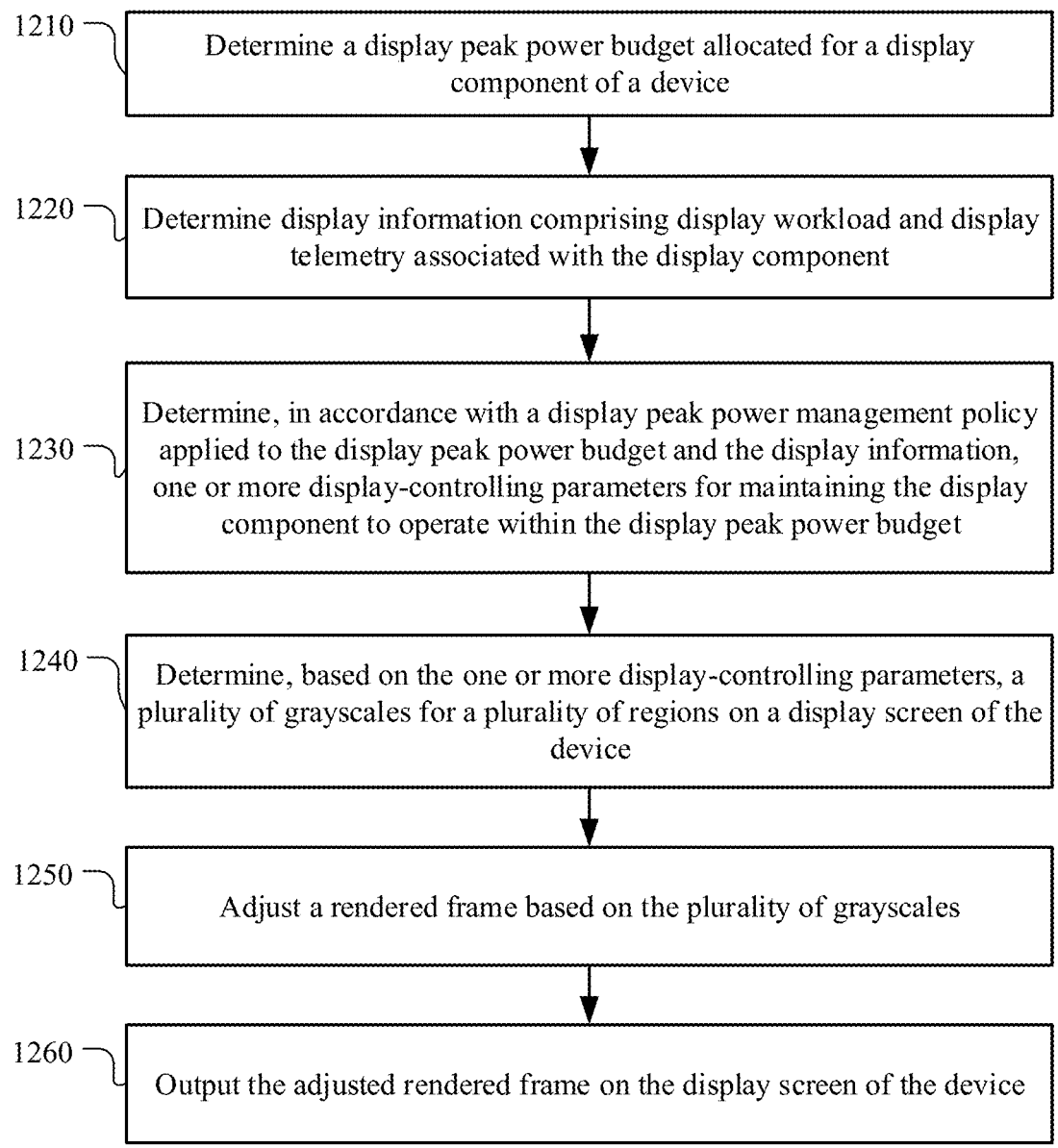
FIG. 12 illustrates an example method for determining display-controlling parameters for maintaining a display component to operate within a display peak power budget and adjusting a rendered frame based on the display-controlling parameters, in accordance with particular embodiments.

FIG. 12 illustrates an example method 1200 for determining display-controlling parameters for maintaining a display component to operate within a display peak power budget and adjusting a rendered frame based on the display-controlling parameters. The method 1200 may begin at step 1210, where a computing system of a device (e.g., device 100 or 200) may determine a display peak power budget allocated for a display component of the device. In particular embodiments, the computing system may determine the display peak power budget by analyzing a current state of battery charge, a status of battery wear out, and a system temperature, estimating one or more of a battery voltage or resistance based on results of its analysis, and allocating peak power budgets to one or more components including the display component of the device based on the estimate battery voltage or resistance. For instance, the system peak power manager 806 may receive an overall system peak power budget from the fuel gauge 804 determined based on the estimated battery voltage or resistance and the system peak power manager 806 may allocate peak power budget to each component of the device, as discussed elsewhere herein.

At step 1220, the computing system of the device may determine display information including display workload and display telemetry associated with the display component. The display telemetry may include one or more of average grayscale values associated with content currently being displayed by the display component, an estimate head pose of a user, an estimate gaze or eye position of the user, a display fill rate of the display component, or a frequency of head movement. The display workload may include or define amount of content that is currently being displayed or to be displayed by the display component of the device.

At step 1230, the computing system of the device may determine, in accordance with a display peak power management policy applied to the display peak power budget and the display information, one or more display-controlling parameters for maintaining the display component to operate within the display peak power budget. The one or more display-controlling parameters may define, for example and without limitation, a size limit on a fovea region (e.g., foveal bounding box) of an eye of a user, a maximum number of periphery regions that can be considered along with their bounding boxes/sizes, and grayscale values for pixels associated with the fovea region and each of the periphery regions. In particular embodiments, the one or more display-controlling parameters may be updated at periodic time intervals based on an updated or revised display peak power budget (e.g., increase or decrease in peak power budget allowed for display component), current display workload, and current display telemetry.

At step 1240, the computing system of the device may determine, based on the one or more display-controlling parameters, a plurality of grayscales for a plurality of regions on a display screen of the device. The plurality of regions may include a fovea region and one or more periphery regions. At step 1250, the computing system may adjust a rendered frame based on the plurality of grayscales. In particular embodiments, the computing system may adjust the rendered frame by estimating a current gaze or position of an eye of a user, determining a fovea region and one or more periphery regions based on the current gaze or position of the eye, and adjusting grayscale values for pixels in the one or more periphery regions. The grayscale values may be adjusted based on grayscale values defined by the one or more display-controlling parameters. In particular embodiments, adjusting the grayscale values for the pixels in the one or more periphery regions may include reducing color intensities of the pixels in the one or more periphery regions, while keeping the same grayscale values (e.g., color intensities) of the pixels in the fovea region, as discussed elsewhere herein.

In particular embodiments, the grayscale values for pixels associated with the fovea region are higher than the grayscale values for pixels associated with each of the one or more periphery regions. As an example, content in the foveal region may be displayed at a higher or original brightness or luminance level, while content in the one or more periphery region(s) may be displayed at a reduced brightness or luminance level, as shown for example in FIG. 10. In some embodiments, the grayscale values for pixels associated with each periphery region of the one or more periphery regions are different. For instance, different periphery regions may be displayed at different color intensities, grayscales, or brightness, as shown for example in FIG. 11.

In some embodiments, the computing system of the device may also determine, based on the one or more display-controlling parameters, a size limit on a fovea region of an eye of a user, and adjust the rendered frame further based on the size limit on the fovea region. For instance, the one or more display-controlling parameters may define based on the display peak power budget (e.g., display peak power budget 820) that the fovea region should be constrained to specific dimensions or to a particular size, and the computing system may adjust the rendered frame based on the specific dimensions or size of the fovea region defined by the one or more display-controlling parameters to maintain the display component to operate within the display peak power budget. In particular embodiments, the computing system may adjust the rendered frame based on the size limit on the fovea region by estimating a current gaze or position of an eye of a user, determining a current fovea region based on the current gaze or position of the eye, and adjusting a size of the current fovea region based on the size limit on the fovea region defined by the one or more display-controlling parameters. In particular embodiments, adjusting the size of the current fovea region may include reducing the size of the current fovea region, as shown for example in FIG. 10. Pixels in the reduced fovea region may be illuminated at a maximum luminance level allowed by the display peak power budget. In particular embodiments, the device discussed herein is an augmented reality (AR) device and the reduced foveal region substantially covers AR content without compromise in image quality.

At step 1260, the computing system of the device may output the adjusted rendered frame on the display screen of the device. In one embodiment, the rendered frame may be adjusted based on grayscale values defined by the one or more display-controlling parameters for a plurality of regions (e.g., fovea and periphery regions). In another embodiment, the rendered frame may be adjusted based on foveal bounding box or size limit on the fovea region defined by the one or more display-controlling parameters. In yet another embodiment, the rendered frame may be adjusted based on a combination of grayscale as well as fovea region adjustment, as discussed elsewhere herein.

Particular embodiments may repeat one or more steps of the method of FIG. 12, where appropriate. Although this disclosure describes and illustrates particular steps of the method of FIG. 12 as occurring in a particular order, this disclosure contemplates any suitable steps of the method of FIG. 12 occurring in any suitable order. Moreover, although this disclosure describes and illustrates an example method for determining display-controlling parameters for maintaining a display component to operate within a display peak power budget and adjusting a rendered frame based on the display-controlling parameters, including the particular steps of the method of FIG. 12, this disclosure contemplates any suitable method for determining display-controlling parameters for maintaining a display component to operate within a display peak power budget and adjusting a rendered frame based on the display-controlling parameters, including any suitable steps, which may include a subset of the steps of the method of FIG. 12, where appropriate. Furthermore, although this disclosure describes and illustrates particular components, devices, or systems carrying out particular steps of the method of FIG. 12, this disclosure contemplates any suitable combination of any suitable components, devices, or systems carrying out any suitable steps of the method of FIG. 12.

Figure 13:
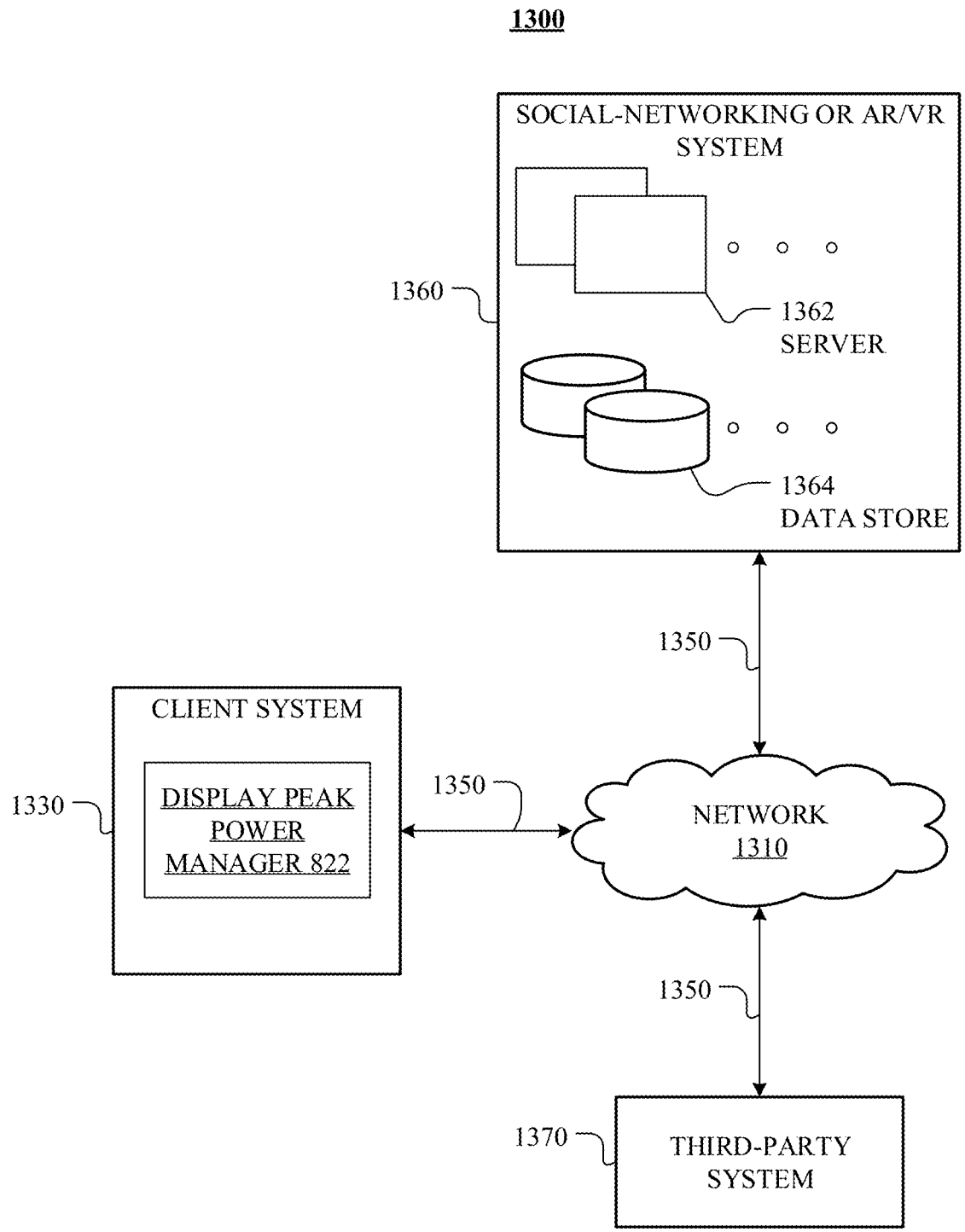
FIG. 13 illustrates an example network environment associated with an AR/VR or social-networking system.

FIG. 13 illustrates an example network environment 1300 associated with an AR/VR or social-networking system. Network environment 1300 includes a client system 1330 (e.g., the artificial reality system 100), a VR (or AR) or social-networking system 1360, and a third-party system 1370 connected to each other by a network 1310. Although FIG. 13 illustrates a particular arrangement of client system 1330, VR or social-networking system 1360, third-party system 1370, and network 1310, this disclosure contemplates any suitable arrangement of client system 1330, AR/VR or social-networking system 1360, third-party system 1370, and network 1310. As an example and not by way of limitation, two or more of client system 1330, AR/VR or social-networking system 1360, and third-party system 1370 may be connected to each other directly, bypassing network 1310. As another example, two or more of client system 1330, AR/VR or social-networking system 1360, and third-party system 1370 may be physically or logically co-located with each other in whole or in part. Moreover, although FIG. 13 illustrates a particular number of client systems 1330, AR/VR or social-networking systems 1360, third-party systems 1370, and networks 1310, this disclosure contemplates any suitable number of client systems 1330, AR/VR or social-networking systems 1360, third-party systems 1370, and networks 1310. As an example and not by way of limitation, network environment 1300 may include multiple client system 1330, AR/VR or social-networking systems 1360, third-party systems 1370, and networks 1310.

This disclosure contemplates any suitable network 1310. As an example and not by way of limitation, one or more portions of network 1310 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1310 may include one or more networks 1310.

Links 1350 may connect client system 1330, social-networking system 1360, and third-party system 1370 to communication network 1310 or to each other. This disclosure contemplates any suitable links 1350. In particular embodiments, one or more links 1350 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 1350 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 1350, or a combination of two or more such links 1350. Links 1350 need not necessarily be the same throughout network environment 1300. One or more first links 1350 may differ in one or more respects from one or more second links 1350.

In particular embodiments, client system 1330 may be an electronic device including hardware, software, or embedded logic components or a combination of two or more such components and capable of carrying out the appropriate functionalities implemented or supported by client system 1330. As an example and not by way of limitation, a client system 1330 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 1330. A client system 1330 may enable a network user at client system 1330 to access network 1310. A client system 1330 may enable its user to communicate with other users at other client systems 1330.

In particular embodiments, client system 1330 (e.g., artificial reality system 100) may include a display peak power manager 822 to maintain a display component of the client system to operate within a display peak power budget described herein, and may have one or more add-ons, plug-ins, or other extensions. A user at client system 1330 may connect to a particular server (such as server 1362, or a server associated with a third-party system 1370). The server may accept the request and communicate with the client system 1330.

In particular embodiments, AR/VR or social-networking system 1360 may be a network-addressable computing system that can host an online Virtual Reality environment, an augmented reality environment, or social network. AR/VR or social-networking system 1360 may generate, store, receive, and send social-networking data, such as, for example, user-profile data, concept-profile data, social-graph information, or other suitable data related to the online social network. Social-networking or AR/VR system 1360 may be accessed by the other components of network environment 1300 either directly or via network 1310. As an example and not by way of limitation, client system 1330 may access social-networking or AR/VR system 1360 using a web browser, or a native application associated with social-networking or AR/VR system 1360 (e.g., a mobile social-networking application, a messaging application, another suitable application, or any combination thereof) either directly or via network 1310. In particular embodiments, social-networking or AR/VR system 1360 may include one or more servers 1362. Each server 1362 may be a unitary server or a distributed server spanning multiple computers or multiple datacenters. Servers 1362 may be of various types, such as, for example and without limitation, a mapping server, web server, news server, mail server, message server, advertising server, file server, application server, exchange server, database server, proxy server, another server suitable for performing functions or processes described herein, or any combination thereof. In particular embodiments, each server 1362 may include hardware, software, or embedded logic components or a combination of two or more such components for carrying out the appropriate functionalities implemented or supported by server 1362. In particular embodiments, social-networking or AR/VR system 1360 may include one or more data stores 1364. Data stores 1364 may be used to store various types of information. In particular embodiments, the information stored in data stores 1364 may be organized according to specific data structures. In particular embodiments, each data store 1364 may be a relational, columnar, correlation, or other suitable database. Although this disclosure describes or illustrates particular types of databases, this disclosure contemplates any suitable types of databases. Particular embodiments may provide interfaces that enable a client system 1330, a social-networking or AR/VR system 1360, or a third-party system 1370 to manage, retrieve, modify, add, or delete, the information stored in data store 1364.

In particular embodiments, social-networking or AR/VR system 1360 may store one or more social graphs in one or more data stores 1364. In particular embodiments, a social graph may include multiple nodes—which may include multiple user nodes (each corresponding to a particular user) or multiple concept nodes (each corresponding to a particular concept)—and multiple edges connecting the nodes. Social-networking or AR/VR system 1360 may provide users of the online social network the ability to communicate and interact with other users. In particular embodiments, users may join the online social network via social-networking or AR/VR system 1360 and then add connections (e.g., relationships) to a number of other users of social-networking or AR/VR system 1360 to whom they want to be connected. Herein, the term "friend" may refer to any other user of social-networking or AR/VR system 1360 with whom a user has formed a connection, association, or relationship via social-networking or AR/VR system 1360.

In particular embodiments, social-networking or AR/VR system 1360 may provide users with the ability to take actions on various types of items or objects, supported by social-networking or AR/VR system 1360. As an example and not by way of limitation, the items and objects may include groups or social networks to which users of social-networking or AR/VR system 1360 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking or AR/VR system 1360 or by an external system of third-party system 1370, which is separate from social-networking or AR/VR system 1360 and coupled to social-networking or AR/VR system 1360 via a network 1310.

In particular embodiments, social-networking or AR/VR system 1360 may be capable of linking a variety of entities. As an example and not by way of limitation, social-networking or AR/VR system 1360 may enable users to interact with each other as well as receive content from third-party systems 1370 or other entities, or to allow users to interact with these entities through an application programming interfaces (API) or other communication channels.

In particular embodiments, a third-party system 1370 may include one or more types of servers, one or more data stores, one or more interfaces, including but not limited to APIs, one or more web services, one or more content sources, one or more networks, or any other suitable components, e.g., that servers may communicate with. A third-party system 1370 may be operated by a different entity from an entity operating social-networking or AR/VR system 1360. In particular embodiments, however, social-networking or AR/VR system 1360 and third-party systems 1370 may operate in conjunction with each other to provide social-networking services to users of social-networking or AR/VR system 1360 or third-party systems 1370. In this sense, social-networking or AR/VR system 1360 may provide a platform, or backbone, which other systems, such as third-party systems 1370, may use to provide social-networking services and functionality to users across the Internet.

In particular embodiments, a third-party system 1370 may include a third-party content object provider. A third-party content object provider may include one or more sources of content objects, which may be communicated to a client system 1330. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking or AR/VR system 1360 also includes user-generated content objects, which may enhance a user's interactions with social-networking or AR/VR system 1360. User-generated content may include anything a user can add, upload, send, or "post" to social-networking or AR/VR system 1360. As an example and not by way of limitation, a user communicates posts to social-networking or AR/VR system 1360 from a client system 1330. Posts may include data such as status updates or other textual data, location information, photos, videos, links, music or other similar data or media. Content may also be added to social-networking or AR/VR system 1360 by a third-party through a "communication channel," such as a newsfeed or stream.

In particular embodiments, social-networking or AR/VR system 1360 may include a variety of servers, sub-systems, programs, modules, logs, and data stores. In particular embodiments, social-networking or AR/VR system 1360 may include one or more of the following: a web server, a mapping server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking or AR/VR system 1360 may also include suitable components such as network interfaces, security mechanisms, load balancers, failover servers, management-and-network-operations consoles, other suitable components, or any suitable combination thereof. In particular embodiments, social-networking or AR/VR system 1360 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking or AR/VR system 1360 to one or more client systems 1330 or one or more third-party system 1370 via network 1310. The web server may include a mail server or other messaging functionality for receiving and routing messages between social-networking or AR/VR system 1360 and one or more client systems 1330. An API-request server may allow a third-party system 1370 to access information from social-networking or AR/VR system 1360 by calling one or more APIs. An action logger may be used to receive communications from a web server about a user's actions on or off social-networking or AR/VR system 1360. In conjunction with the action log, a third-party-content-object log may be maintained of user exposures to third-party-content objects. A notification controller may provide information regarding content objects to a client system 1330. Information may be pushed to a client system 1330 as notifications, or information may be pulled from client system 1330 responsive to a request received from client system 1330. Authorization servers may be used to enforce one or more privacy settings of the users of social-networking or AR/VR system 1360. A privacy setting of a user determines how particular information associated with a user can be shared. The authorization server may allow users to opt in to or opt out of having their actions logged by social-networking or AR/VR system 1360 or shared with other systems (e.g., third-party system 1370), such as, for example, by setting appropriate privacy settings. Third-party-content-object stores may be used to store content objects received from third parties, such as a third-party system 1370. Location stores may be used for storing location information received from client systems 1330 associated with users. Advertisement-pricing modules may combine social information, the current time, location information, or other suitable information to provide relevant advertisements, in the form of notifications, to a user.

Figure 14:
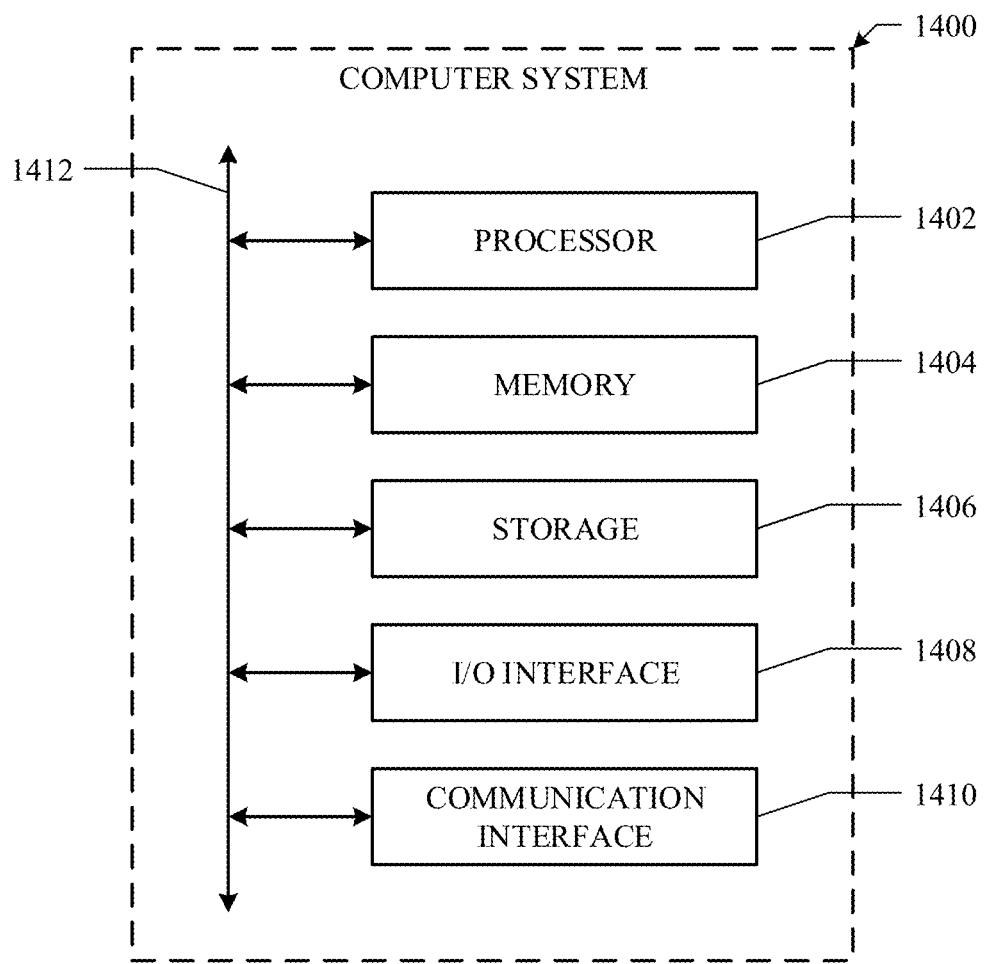
FIG. 14 illustrates an example computer system.

FIG. 14 illustrates an example computer system 1400. In particular embodiments, one or more computer systems 1400 perform one or more steps of one or more methods described or illustrated herein. In particular embodiments, one or more computer systems 1400 provide functionality described or illustrated herein. In particular embodiments, software running on one or more computer systems 1400 performs one or more steps of one or more methods described or illustrated herein or provides functionality described or illustrated herein. Particular embodiments include one or more portions of one or more computer systems 1400. Herein, reference to a computer system may encompass a computing device, and vice versa, where appropriate. Moreover, reference to a computer system may encompass one or more computer systems, where appropriate.

This disclosure contemplates any suitable number of computer systems 1400. This disclosure contemplates computer system 1400 taking any suitable physical form. As example and not by way of limitation, computer system 1400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1400 may include one or more computer systems 1400; be unitary or distributed; span multiple locations; span multiple machines; span multiple data centers; or reside in a cloud, which may include one or more cloud components in one or more networks. Where appropriate, one or more computer systems 1400 may perform without substantial spatial or temporal limitation one or more steps of one or more methods described or illustrated herein. As an example and not by way of limitation, one or more computer systems 1400 may perform in real time or in batch mode one or more steps of one or more methods described or illustrated herein. One or more computer systems 1400 may perform at different times or at different locations one or more steps of one or more methods described or illustrated herein, where appropriate.

In particular embodiments, computer system 1400 includes a processor 1402, memory 1404, storage 1406, an input/output (I/O) interface 1408, a communication interface 1410, and a bus 1412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1402 includes hardware for executing instructions, such as those making up a computer program. As an example and not by way of limitation, to execute instructions, processor 1402 may retrieve (or fetch) the instructions from an internal register, an internal cache, memory 1404, or storage 1406; decode and execute them; and then write one or more results to an internal register, an internal cache, memory 1404, or storage 1406. In particular embodiments, processor 1402 may include one or more internal caches for data, instructions, or addresses. This disclosure contemplates processor 1402 including any suitable number of any suitable internal caches, where appropriate. As an example and not by way of limitation, processor 1402 may include one or more instruction caches, one or more data caches, and one or more translation lookaside buffers (TLBs). Instructions in the instruction caches may be copies of instructions in memory 1404 or storage 1406, and the instruction caches may speed up retrieval of those instructions by processor 1402. Data in the data caches may be copies of data in memory 1404 or storage 1406 for instructions executing at processor 1402 to operate on; the results of previous instructions executed at processor 1402 for access by subsequent instructions executing at processor 1402 or for writing to memory 1404 or storage 1406; or other suitable data. The data caches may speed up read or write operations by processor 1402. The TLBs may speed up virtual-address translation for processor 1402. In particular embodiments, processor 1402 may include one or more internal registers for data, instructions, or addresses. This disclosure contemplates processor 1402 including any suitable number of any suitable internal registers, where appropriate. Where appropriate, processor 1402 may include one or more arithmetic logic units (ALUs); be a multi-core processor; or include one or more processors 1402. Although this disclosure describes and illustrates a particular processor, this disclosure contemplates any suitable processor.

In particular embodiments, memory 1404 includes main memory for storing instructions for processor 1402 to execute or data for processor 1402 to operate on. As an example and not by way of limitation, computer system 1400 may load instructions from storage 1406 or another source (such as, for example, another computer system 1400) to memory 1404. Processor 1402 may then load the instructions from memory 1404 to an internal register or internal cache. To execute the instructions, processor 1402 may retrieve the instructions from the internal register or internal cache and decode them. During or after execution of the instructions, processor 1402 may write one or more results (which may be intermediate or final results) to the internal register or internal cache. Processor 1402 may then write one or more of those results to memory 1404. In particular embodiments, processor 1402 executes only instructions in one or more internal registers or internal caches or in memory 1404 (as opposed to storage 1406 or elsewhere) and operates only on data in one or more internal registers or internal caches or in memory 1404 (as opposed to storage 1406 or elsewhere). One or more memory buses (which may each include an address bus and a data bus) may couple processor 1402 to memory 1404. Bus 1412 may include one or more memory buses, as described below. In particular embodiments, one or more memory management units (MMUs) reside between processor 1402 and memory 1404 and facilitate accesses to memory 1404 requested by processor 1402. In particular embodiments, memory 1404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1404 may include one or more memories 1404, where appropriate. Although this disclosure describes and illustrates particular memory, this disclosure contemplates any suitable memory.

In particular embodiments, storage 1406 includes mass storage for data or instructions. As an example and not by way of limitation, storage 1406 may include a hard disk drive (HDD), a floppy disk drive, flash memory, an optical disc, a magneto-optical disc, magnetic tape, or a Universal Serial Bus (USB) drive or a combination of two or more of these. Storage 1406 may include removable or non-removable (or fixed) media, where appropriate. Storage 1406 may be internal or external to computer system 1400, where appropriate. In particular embodiments, storage 1406 is non-volatile, solid-state memory. In particular embodiments, storage 1406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1406 taking any suitable physical form. Storage 1406 may include one or more storage control units facilitating communication between processor 1402 and storage 1406, where appropriate. Where appropriate, storage 1406 may include one or more storages 1406. Although this disclosure describes and illustrates particular storage, this disclosure contemplates any suitable storage.

In particular embodiments, I/O interface 1408 includes hardware, software, or both, providing one or more interfaces for communication between computer system 1400 and one or more I/O devices. Computer system 1400 may include one or more of these I/O devices, where appropriate. One or more of these I/O devices may enable communication between a person and computer system 1400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1408 for them. Where appropriate, I/O interface 1408 may include one or more device or software drivers enabling processor 1402 to drive one or more of these I/O devices. I/O interface 1408 may include one or more I/O interfaces 1408, where appropriate. Although this disclosure describes and illustrates a particular I/O interface, this disclosure contemplates any suitable I/O interface.

In particular embodiments, communication interface 1410 includes hardware, software, or both providing one or more interfaces for communication (such as, for example, packet-based communication) between computer system 1400 and one or more other computer systems 1400 or one or more networks. As an example and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1410 for it. As an example and not by way of limitation, computer system 1400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1400 may include any suitable communication interface 1410 for any of these networks, where appropriate. Communication interface 1410 may include one or more communication interfaces 1410, where appropriate. Although this disclosure describes and illustrates a particular communication interface, this disclosure contemplates any suitable communication interface.

In particular embodiments, bus 1412 includes hardware, software, or both coupling components of computer system 1400 to each other. As an example and not by way of limitation, bus 1412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1412 may include one or more buses 1412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system of a device:
    determining a display peak power budget allocated for a display component of the device;
    determining display information comprising display workload and display telemetry associated with the display component;
    prior to performing eye tracking, determining, based on the display peak power budget allocated for the display component of the device and the display information, a plurality of display-controlling parameters comprising instructions for the display component of the device on how to render a display at run time to meet the display peak power budget, wherein the plurality of display-controlling parameters, determined prior to performing the eye tracking, defines (1) particular size of a fovea region of an eye of a user at run time, (2) a particular number of periphery regions at run time, and (3) particular grayscale values for pixels in the periphery regions in the particular number of periphery regions at run time;
    determining a current fovea region and a plurality of periphery regions by performing the eye tracking;
    adjusting, at run time, the plurality of periphery regions, determined by performing the eye tracking, to the particular number of periphery regions defined by the plurality of display-controlling parameters determined prior to performing the eye tracking;
    simultaneously adjusting at run time (1) the current fovea region, determined by performing the eye tracking, from a first size to a second size based on the particular size of the fovea region defined by the plurality of display-controlling parameters determined prior to performing the eye tracking and (2) grayscale values for the pixels in adjusted plurality of periphery regions based on the particular grayscale values defined by the plurality of display-controlling parameters determined prior to performing the eye tracking;

adjusting a rendered display frame based on the adjusted fovea region and the adjusted grayscale values for the pixels in the adjusted plurality of periphery regions; and outputting the adjusted rendered display frame on a display screen of the device.

2. The method of claim 1, wherein the display screen comprises a plurality of regions, wherein the plurality of regions comprises the adjusted fovea region and the adjusted plurality of periphery regions.

3. The method of claim 1, wherein the plurality of display-controlling parameters are determined in accordance with a display peak power management policy applied to the display peak power budget and the display information, and wherein the plurality of display-controlling parameters further defines:

corresponding sizes of the particular number of periphery regions; and grayscale values for pixels associated with the fovea region.

4. The method of claim 1, wherein grayscale values for pixels associated with the adjusted fovea region are relatively higher than the grayscale values for the pixels associated with each of the periphery regions of the adjusted plurality of periphery regions.

5. The method of claim 1, wherein the grayscale values for pixels associated with each periphery region of the adjusted plurality of periphery regions are different.

6. The method of claim 1, wherein adjusting, at run time, the grayscale values for the pixels in the adjusted plurality of periphery regions comprises:

reducing color intensities of the pixels in the adjusted plurality of periphery regions.

7. The method of claim 1, wherein performing the eye tracking comprises:

estimating a current gaze of the eye; and determining the current fovea region and the plurality of periphery regions based on the current gaze of the eye.

8. The method of claim 1, wherein adjusting, at run time, the current fovea region comprises:

reducing a size of the current fovea region from the first size to the second size.

9. The method of claim 1, wherein:

the device is an augmented reality device.

10. The method of claim 1, wherein determining the display peak power budget comprises:

analyzing a current state of battery charge, a status of battery wear out, and a temperature of the device;

estimating one or more of battery voltage or resistance based on the current state of battery charge, the status of battery wear out, and the temperature; and allocating the display peak power budget to the display component of the device based on the estimated battery voltage or resistance.

11. The method of claim 1, wherein the display telemetry comprises one or more of:

average grayscale values associated with content currently being displayed by the display component;

an estimated head pose of the user;

an estimated eye position of the user;

a fill rate of the display component; or a frequency of head movement.

12. The method of claim 1, further comprising:

receiving updated display peak power budget and updated display information; and updating one or more display-controlling parameters of the plurality of display-controlling parameters based on the updated display peak power budget and the updated display information.

13. The method of claim 1, wherein pixels in the adjusted fovea region are illuminated at a maximum luminance level allowed by the display peak power budget.

14. The method of claim 1, wherein the adjusted fovea region substantially covers augmented reality content without comprise in image quality.

15. One or more computer-readable non-transitory storage media embodying software that is operable when executed, by one or more processors, to:

determine a display peak power budget allocated for a display component of a device;

determine display information comprising display workload and display telemetry associated with the display component;

prior to performing eye tracking, determine, based on the display peak power budget allocated for the display component of the device and the display information, a plurality of display-controlling parameters comprising instructions for the display component of the device on how to render a display at run time to meet the display peak power budget, wherein the plurality of display-controlling parameters, determined prior to performing the eye tracking, defines (1) particular size of a fovea region of an eye of a user at run time, (2) a particular number of periphery regions at run time, and (3) particular grayscale values for pixels in the periphery regions in the particular number of periphery regions at run time;

determine a current fovea region and a plurality of periphery regions by performing the eye tracking;

adjust, at run time, the plurality of periphery regions, determined by performing the eye tracking, to the particular number of periphery regions defined by the plurality of display-controlling parameters determined prior to performing the eye tracking;

simultaneously adjust at run time (1) the current fovea region, determined by performing the eye tracking, from a first size to a second size based on the particular size of the fovea region defined by the plurality of display-controlling parameters determined prior to performing the eye tracking and (2) grayscale values for the pixels in adjusted plurality of periphery regions based on the particular grayscale values defined by the plurality of display-controlling parameters determined prior to performing the eye tracking;

adjust a rendered display frame based on the adjusted fovea region and the adjusted grayscale values for the pixels in the adjusted plurality of periphery regions; and output the adjusted rendered display frame on a display screen of the device.

16. The one or more computer-readable non-transitory storage media of claim 15, wherein the display screen comprises a plurality of regions, wherein the plurality of regions comprises the adjusted fovea region and the adjusted plurality of periphery regions.

17. The one or more computer-readable non-transitory storage media of claim 15, wherein the plurality of display-controlling parameters are determined in accordance with a display peak power management policy applied to the display peak power budget and the display information, and wherein the plurality of display-controlling parameters further defines:

corresponding sizes of the particular number of periphery regions; and grayscale values for pixels associated with the fovea region.

18. A system comprising:

one or more processors; and one or more computer-readable non-transitory storage media coupled to one or more of the processors and comprising instructions operable when executed by one or more of the processors to cause the system to:

determine a display peak power budget allocated for a display component of a device;

determine display information comprising display workload and display telemetry associated with the display component;

prior to performing eye tracking, determine, based on the display peak power budget allocated for the display component of the device and the display information, a plurality of display-controlling parameters comprising instructions for the display component of the device on how to render a display at run time to meet the display peak power budget, wherein the plurality of display-controlling parameters, determined prior to performing the eye tracking, defines (1) particular size of a fovea region of an eye of a user at run time, (2) a particular number of periphery regions at run time, and (3) particular grayscale values for pixels in the periphery regions in the particular number of periphery regions at run time;

determine a current fovea region and a plurality of periphery regions by performing the eye tracking;

adjust, at run time, the plurality of periphery regions, determined by performing the eye tracking, to the particular number of periphery regions defined by the plurality of display-controlling parameters determined prior to performing the eye tracking;

simultaneously adjust at run time (1) the current fovea region, determined by performing the eye tracking, from a first size to a second size based on the particular size of the fovea region defined by the plurality of display-controlling parameters determined prior to performing the eye tracking and (2) grayscale values for the pixels in adjusted plurality of periphery regions based on the particular grayscale values defined by the plurality of display-controlling parameters determined prior to performing the eye tracking;

adjust a rendered display frame based on the adjusted fovea region and the adjusted grayscale values for the pixels in the adjusted plurality of periphery regions; and output the adjusted rendered display frame on a display screen of the device.

19. The system of claim 18, wherein the display screen comprises a plurality of regions, wherein the plurality of regions comprises the adjusted fovea region and the adjusted plurality of periphery regions.

20. The system of claim 18, wherein the plurality of display-controlling parameters are determined in accordance with a display peak power management policy applied to the display peak power budget and the display information, and wherein the plurality of display-controlling parameters further defines:

corresponding sizes of the particular number of periphery regions; and grayscale values for pixels associated with the fovea region.

* * * * *